US011795906B2

United States Patent
Churchill

(10) Patent No.: US 11,795,906 B2
(45) Date of Patent: Oct. 24, 2023

(54) POWERED AUGMENTED FLUID TURBINES

(71) Applicant: ORGANOWORLD INC., Brossard (CA)

(72) Inventor: Frederick Churchill, Brossard (CA)

(73) Assignee: ORGANOWORLD INC., Etobicoke (CA)

( * ) Notice: Subject to any disclaimer, the term of this patent is extended or adjusted under 35 U.S.C. 154(b) by 310 days.

(21) Appl. No.: 17/283,015

(22) PCT Filed: Oct. 5, 2018

(86) PCT No.: PCT/CA2018/051261
§ 371 (c)(1),
(2) Date: Apr. 5, 2021

(87) PCT Pub. No.: WO2020/069592
PCT Pub. Date: Apr. 9, 2020

(65) Prior Publication Data
US 2021/0348590 A1    Nov. 11, 2021

(51) Int. Cl.
*F03D 1/04*    (2006.01)
*F03D 80/00*    (2016.01)
(Continued)

(52) U.S. Cl.
CPC .............. *F03D 1/04* (2013.01); *F01D 1/04* (2013.01); *F01D 17/08* (2013.01); *F01D 25/24* (2013.01);
(Continued)

(58) Field of Classification Search
CPC ... F03D 1/04; F03D 9/25; F03D 80/00; F01D 1/04; F01D 17/08; F01D 25/24;
(Continued)

(56) References Cited

U.S. PATENT DOCUMENTS 2,746,242 A * 5/1956 Reed ................ F01D 17/08
60/242
4,041,710 A * 8/1977 Kraus .............. F01K 27/005
60/673
(Continued)

FOREIGN PATENT DOCUMENTS

| GB | 2508053 A | * | 5/2014 | ............... F03D 1/04 |
| WO | WO-2008092449 A2 | * | 8/2008 | ............... F03D 7/02 |
| WO | 2013120198 A1 | | 8/2013 | |

OTHER PUBLICATIONS

WO-2008092449-A2 description Date: 2008.*
(Continued)

*Primary Examiner* — Mickey H France
(74) *Attorney, Agent, or Firm* — Lavery, de Billy, L.L.P.; Gonzalo Lavin

(57) ABSTRACT

A powered augmented fluid turbine for generating electricity from a fluid in motion comprising: a central annular ducted channel extending between an inlet distribution header and an outlet distribution header, the channel comprising a converging section configured to accelerate the fluid received at the inlet distribution header, a turbine assembly for generating electricity, and a diffuser section configured to decelerate the fluid before it exits at the outlet distribution header; a recycle line for transporting the exiting fluid to the inlet distribution header in a closed-loop configuration, the recycle line comprising a recycle line propulsor controllable by a recycle line controller and a recycle line heat exchanger; and a compressed fluid distribution line configured to pressurize the fluid in motion by transporting a compressed fluid from a compressed fluid source to the inlet and outlet distribution headers, the compressed fluid distribution line controllable by at least one pressure controller.

20 Claims, 16 Drawing Sheets

(51) Int. Cl.
*F01D 1/04* (2006.01)
*F03B 3/04* (2006.01)
*F03G 7/10* (2006.01)
*F01D 25/24* (2006.01)
*F03D 9/25* (2016.01)
*F01D 17/08* (2006.01)
*F03B 13/10* (2006.01)
*F01D 15/10* (2006.01)
*F01D 17/14* (2006.01)

(52) U.S. Cl.
CPC .............. *F03B 3/04* (2013.01); *F03D 9/25* (2016.05); *F03D 80/00* (2016.05); *F03G 7/10* (2013.01); *F01D 15/10* (2013.01); *F01D 17/141* (2013.01); *F03B 13/10* (2013.01); *F05B 2210/16* (2013.01); *F05B 2210/40* (2013.01); *F05B 2220/20* (2013.01); *F05B 2220/30* (2013.01); *F05B 2220/32* (2013.01); *F05B 2240/12* (2013.01); *F05B 2240/133* (2013.01); *F05B 2260/60* (2013.01); *F05D 2270/17* (2013.01)

(58) Field of Classification Search
CPC .......... F01D 15/10; F01D 17/141; F03B 3/04; F03B 13/10; F03G 7/10; F05B 2210/16; F05B 2210/40; F05B 2220/20; F05B 2220/30; F05B 2220/32; F05B 2240/12; F05B 2240/133; F05B 2260/60; F05D 2270/17
See application file for complete search history.

(56) References Cited

U.S. PATENT DOCUMENTS

| | | | | |
|---|---|---|---|---|
| 4,075,500 | A | | 2/1978 | Oman et al. |
| 4,143,516 | A | * | 3/1979 | Long .................... F01K 21/005 60/649 |
| 4,578,943 | A | * | 4/1986 | Scampini .............. F01K 21/04 60/649 |
| 5,083,423 | A | * | 1/1992 | Prochaska ............. F02C 7/04 60/772 |
| 5,734,202 | A | * | 3/1998 | Shuler .................. F03D 9/00 290/55 |
| 5,800,121 | A | * | 9/1998 | Fanelli .................. F01D 1/02 415/59.1 |
| 7,763,988 | B1 | * | 7/2010 | Dravis .................. F01D 1/023 290/1 R |
| 8,063,502 | B1 | * | 11/2011 | Voyles .................. F03D 15/20 290/55 |
| 2002/0050719 | A1 | * | 5/2002 | Caddell ................. F02K 7/12 290/54 |
| 2003/0133782 | A1 | * | 7/2003 | Holter .................. F03D 3/0427 415/4.1 |
| 2005/0109030 | A1 | * | 5/2005 | Manolis ................ F03D 5/00 60/641.8 |
| 2007/0041830 | A1 | * | 2/2007 | Lazar ................... F02C 1/08 415/199.5 |
| 2008/0088135 | A1 | * | 4/2008 | Novo Vidal .......... H02K 7/1823 310/156.12 |
| 2008/0181771 | A1 | * | 7/2008 | Papp .................... F03G 6/045 415/208.1 |
| 2009/0134623 | A1 | * | 5/2009 | Krouse ................. F03B 13/08 415/4.1 |
| 2010/0162685 | A1 | | 7/2010 | Hirshberg |
| 2010/0275598 | A1 | * | 11/2010 | Raffaele ............... F03D 1/04 290/1 R |
| 2010/0310361 | A1 | * | 12/2010 | Carre ................... F03D 9/255 415/199.5 |
| 2011/0110797 | A1 | * | 5/2011 | Cho ..................... F03B 13/10 137/14 |
| 2011/0189006 | A1 | * | 8/2011 | Churchill .............. F03D 13/20 415/207 |
| 2012/0003077 | A1 | * | 1/2012 | Churchill .............. F03D 80/00 415/220 |
| 2012/0099977 | A1 | * | 4/2012 | Churchill .............. F03B 3/183 415/185 |
| 2012/0175882 | A1 | * | 7/2012 | Sterling ................ F03D 1/04 290/55 |
| 2012/0230810 | A1 | * | 9/2012 | Al-Shibl ............... F03D 1/04 415/202 |
| 2013/0081381 | A1 | * | 4/2013 | Chen .................... F04F 1/06 60/325 |
| 2013/0257058 | A1 | * | 10/2013 | Wilson ................. F03D 9/34 290/55 |
| 2013/0269355 | A1 | * | 10/2013 | Wichmann ............ F02C 6/18 60/726 |
| 2013/0269357 | A1 | * | 10/2013 | Wichmann ............ F02C 3/34 60/726 |
| 2013/0294885 | A1 | * | 11/2013 | Churchill .............. F03B 15/02 415/48 |
| 2014/0091574 | A1 | * | 4/2014 | Favy .................... F02C 6/16 137/209 |
| 2014/0369826 | A1 | * | 12/2014 | Rohring ................ F03D 9/20 415/207 |
| 2015/0116934 | A1 | * | 4/2015 | Lazzari ................. F01D 15/10 361/692 |
| 2015/0337676 | A1 | * | 11/2015 | Feng .................... F01D 15/10 290/52 |
| 2021/0348590 | A1 | * | 11/2021 | Churchill .............. F01D 15/10 |

OTHER PUBLICATIONS

Canadian Intellectual Property Office International Search Authority, International Search Report and The Written Opinion, dated Jun. 18, 2019, 10 pages, Application No. PCT/CA2018/051261.

* cited by examiner

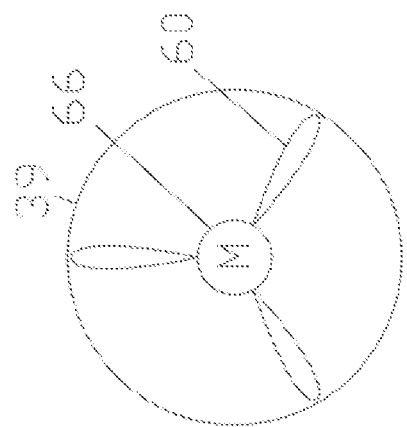
Figure 12.2
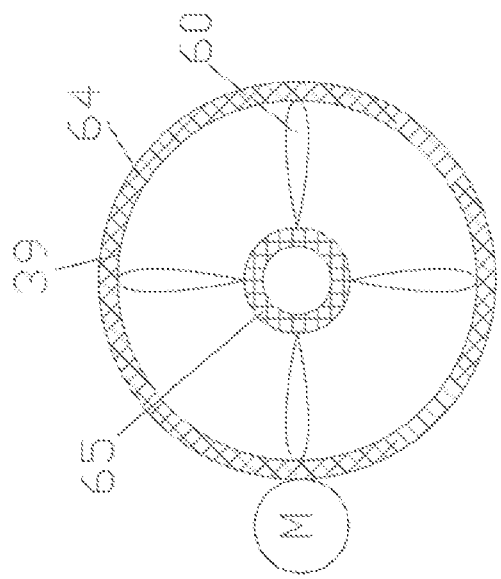
Figure 12.3
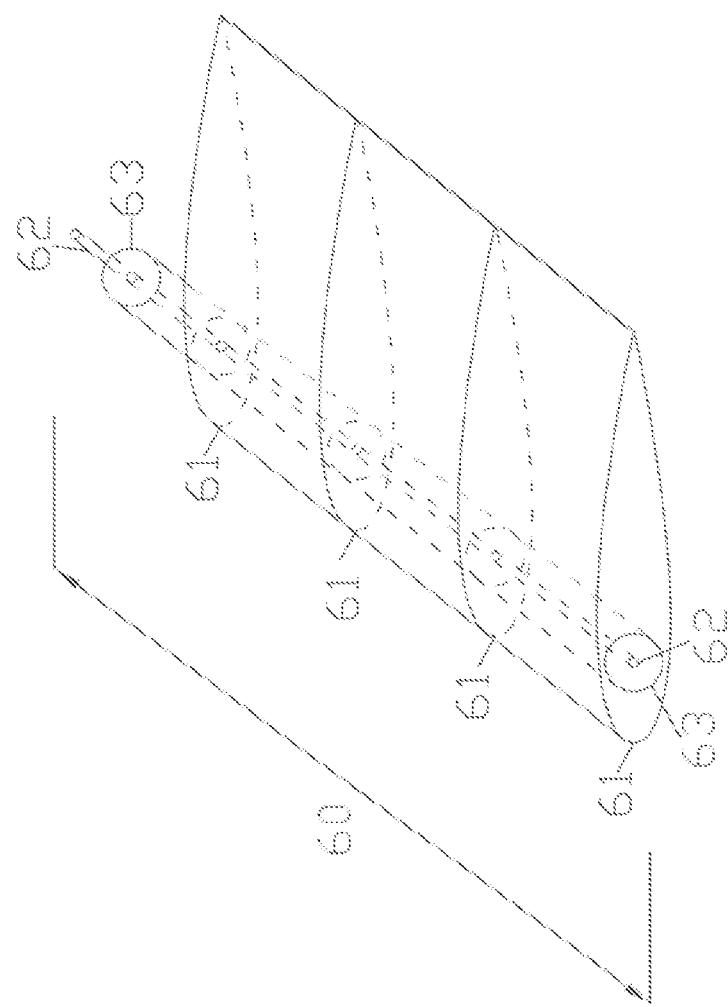
Figure 12.1

POWERED AUGMENTED FLUID TURBINES

CROSS-REFERENCE TO RELATED APPLICATION

This application is a National Entry Application of PCT application No. PCT/CA2018/051261 filed on Oct. 5, 2018 and published in English under PCT Article 21(2). The document above is incorporated herein in its entirety by reference.

FIELD OF THE INVENTION

The present invention relates to competitive powered augmented fluid turbines whereby, for improved performance, external energy is injected into the augmented fluid flow-streams whose parameters are controlled by process control.

BACKGROUND OF THE INVENTION

Augmented wind turbine systems (AWTS) typically refer to fluid turbine systems characterised by a continuous ducted-channel, which is fed by an incoming fluid stream that firstly feeds a convergent section (compression step), then enters a single stage rotor-turbine assembly section (energy extraction), that exits to a diffuser section (decompression step) before being discharged. The standard application fluid may be wind, river water or generated steam. As lift and drag are important flow parameters for this technology, the viscosity of fluids will impact their suitability as higher viscosity leads to higher drag.

Over the years, a number of designs for unpowered, wind-driven AWTS's have been attempted, but they have largely failed due to the application of inefficient aerodynamic designs. Given that air has a relatively low density, the production of competitive electrical power requires the development of a high mass-flow ratio through the turbine. This necessitates two main design features: efficient aerodynamic-shapes and high ratios of compression and decompression of the flow-stream. Efficient aerodynamics are required to avoid early boundary layer separation (BLS) in the decompression section of the ducted-channel.

Typically used wind turbines such as horizontal axis wind turbines (HAWT) achieve high mass flow rates and thus large power outputs by simply implementing large rotor diameters with corresponding large swept areas. With large diameter rotors there is no need for augmentation of the flow-stream velocity. The HAWT must simply be placed on a windy site to operate efficiently. Achieving such mass flow rates for an AWTS has proven to be much more difficult.

One of the first demonstrations of the potential of an unpowered AWTS was presented by Grummond Aerospace of New York in 1975. This was shortly followed by the Diffuser-Assisted Wind Turbine (DAWT) investment project known as the Vortec 7. For this present application, the term 'augmented' is understood to include the term 'diffuser-assisted'. Unfortunately, early-BLS along the diffuser walls and particularly at the entrance to the ducted-channel, coupled with unsteady, non-uniform flow at the diffuser discharge greatly limited the system efficiency of these early unpowered-AWTS's. These designs also used single-stage, center-drive axial rotors that were not designed to provide efficient operation in a ducted-channel. Uneven flow-stream profiles, blade-tip losses, rotor and diffuser-induced downstream turbulence and un-scalable designs are but some of the problems that plagued these early unpowered AWTS's and have yet to be successfully addressed.

In these early unpowered AWTS designs, the augmentation (or compression/deceleration ratios) achieved by the converging and diffusing sections were lower than desired. This was the result of at least four main issues. Firstly, the converging and diverging sections were short, non-aerodynamic, of low efficiency, and single-walled (circular) rather than being double-walled (annular). Secondly, the efficiency of the diverging sections was low due to early-BLS, unstable flows and poor geometry. Thirdly, the ratios for the convergent compression and the diffuser decompression were far too low. Fourthly, low decompression ratios (pull) by the diffusing section made it impossible to increase the compression ratio (push) of the convergent section. If the push-pull of the system is too unbalanced, this in turn eliminates the potential for scalable increases in the mass flow rate. Further, when the flow-stream is pushed harder than it is pulled, a condition known as choked flow will occur, whereby the flow between the convergent and divergent sections will fall to zero as an air barrier is created within the ducted-channel.

Applying common process controls to flow-steams has never been attempted in an unpowered-AWTS, as any control implies some loss of flow-stream energy and there was simply not enough energy available in an unpowered-AWTS to justify adding controls. In the case of HAWT's, the only significant process control used was to adjust the blade pitch-angle versus wind speed, which is not controlling the flow-stream but rather adjusting the blade's geometry to handle an uncontrolled flow-stream. A simple adjustment to the blade's pitch-angle slightly improves the extraction efficiency of the rotor blades.

In 1967, Gino Sovran and Edward D. Klomp of General Motors Research Laboratories published a technical article entitled "Experimentally Determined Optimum Geometries for Rectilinear Diffusers with Rectangular, Conical of or Annular Cross-Section", Elsevier Publishing Company. The following is an excerpt from the report:

"The presence of unsteady and non-uniform discharge flow in a diffuser will have a significant effect on its performance as indicated by its Cp, (coefficient of performance). The geometry of the diffuser can be a prime source of flow instability and if an efficient diffuser is to exist, flow control systems need to be installed to prevent, control or eliminate the occurrence of unsteady or non-uniform discharge flow from all potential sources."

As a basic fact, diffusers work best in steady, uniform flow conditions with an appropriate geometry. An inherent problem to be addressed is the fact that a large object, such as a turbine diffuser, offers a geometric shape that, when installed in a wind stream, will necessarily generate an unsteady, non-uniform trailing wind that contains cross-flows, large eddies and pressure variations. The presence of an unsteady, turbulent, trailing wind is one of the main causes for previous unpowered-ATWS's poor performance, as the trailing wind turbulence is transmitted back into the diffuser itself. As such, the geometry, size and shape of diffusers presently used in unpowered-ATWS's severely limit their performance.

The above cited General Motors Research technical report illustrates the key variables that will influence the operating performance of diffuser designs. Standard designs for unpowered-ATWS diffusers are characterised by a divergence half-angle that is either too low or too high. This angle corresponds to the angle formed between the wall of the diffuser at its inlet and a line parallel to the wall of the ducted-channel at the point that it begins feeding the diffuser. A high divergence half-angle, for example above 5.5 degrees, leads to the onset of early-BLS along the wall of the diffuser inlet and this separation leads to flow instability that rapidly drops the efficiency of the diffuser. The higher the flow-steam velocity and Reynolds number, the higher will be the propensity for early-BLS at all angles above 5.5 degrees.

A second important variable mentioned in the General Motors Research report is the ratio "N/W1", consisting of the axial length of the diffuser (N) divided by its width at the inlet (W1). The amount of energy produced by a system has a significant impact on the cost of the electricity produced. Limiting the length of a large diffuser requires employing a large divergence half-angle. The cited report confirms that the application of such a large divergence half-angle will significantly decrease the efficiency of the diffuser.

It is important to minimize the internal flow losses within a diffuser, particularly the friction losses along the inside face of the diffuser wall. Once the velocity and Reynolds number of the flow-stream adjacent to the wall fall below the minimum value required, the boundary layer flow will separate from the surface of the wall (early-BLS) and stall conditions will prevail. At this point, the diffuser stops providing pull on the flow-stream and momentum recovery from the exhaust stream. The portion of the diffuser section situated upstream of the on-set of early-BLS will continue to provide this but will offer limited deceleration/pull.

Due to the many deficiencies of previously attempted unpowered-ATWS's, most current commercial wind turbines are either open-bladed HAWT's or Vertical Axis Wind Turbines (VAWT's), with rotors of sufficient size to produce electrical power of at least 0.50 megawatts. There is however a world-wide need for a successful augmented turbine design, as the use of a ducted-system with enclosed blades of short length designed into multiple, interdependent-stages will be significantly safer and quieter, thus allowing for installations in urban areas and on rooftops.

As such, there exists a need for a new system which will overcome the above challenges that will offer an augmented fluid turbine to efficiently and effectively produce electricity. Such a system would offer higher aerodynamic efficiencies of the various components of an augmented turbine such as wide-angled diffuser sections, convergent sections, ducted-channels, and annular, multi-stage turbine rotors.

SUMMARY OF THE INVENTION

It is an object of the present invention to provide a powered augmented fluid turbine comprising components with high aerodynamic efficiency that can extract energy from a variety of fluids.

It is another object of the present invention to provide a powered augmented fluid turbine with high and balanced ratios of compression/decompression.

It is another object of the present invention to provide a powered augmented fluid turbine that is designed to allow for scalable mass flow rates.

It is another object of the present invention to provide a powered augmented fluid turbine that allows for efficient power extraction from flow streams exhibiting high energy densities.

It is another object of the present invention to provide a powered augmented fluid turbine whereby balanced and appropriate external energy is injected to stabilize diffuser flow streams and limit early boundary layer separation and stall conditions.

It is another object of the present invention to provide a powered augmented fluid turbine with improved geometry and flow-stream characteristics within the diffuser for maximum efficiency.

It is another object of the present invention to provide a powered augmented fluid turbine whereby a process control system is used to maintain steady and stable flow rates to increase efficiency and to allow for operations using a constant-speed turbine-rotor.

It is another object of the present invention to provide a powered augmented fluid turbine whereby turbulence is reduced, the uniformity of the internal flow-stream is increased, and the aerodynamic efficiency of the flow channel is maximized.

It is another object of the present invention to provide a powered augmented fluid turbine comprising an efficient, segmented, programmable air-foil blade for rectifying flow-stream velocities in circular ducts.

It is another object of the present invention to provide a powered augmented fluid turbine comprising efficient diffusers with large divergence half-angles.

It is another object of the present invention to provide a powered augmented fluid turbine whereby the convergent compression ratio exceeds a value of 3.5.

It is another object of the present invention to provide a powered augmented fluid turbine whereby the combined effects of the interrelated flow ratios of the convergent section, turbine section and diffuser section are correctly balanced.

It is another object of the present invention to provide a powered augmented fluid turbine that is protected from excessive wind velocities and from medium-to-fine sized debris dispersed in the incoming fluid.

It is another object of the present invention to provide a powered augmented fluid turbine that can efficiently extract power from a high velocity flow-stream.

It is another object of the present invention to provide a powered augmented fluid turbine that can be configured to operate with an external source of pressurization to increase the working pressure of the flow streams in order to mitigate the magnitude and duration of flow stream disturbances.

It is another object of the present invention to provide a powered augmented fluid turbine that can be configured to operate in both an open-loop free-flow mode and a closed-loop recycle mode.

In order to address the above drawbacks, there is provided a powered augmented fluid turbine for generating electricity from a fluid in motion, the powered augmented fluid turbine comprising: a central annular ducted channel extending between an inlet distribution header for receiving the fluid and an outlet distribution header for expelling the fluid, the central annular ducted channel comprising a converging section configured to accelerate the fluid received at the inlet distribution header, a turbine assembly for generating electricity, and a diffuser section configured to decelerate the fluid before the fluid exits at the outlet distribution header; a recycle line for transporting the fluid exiting from the outlet distribution header to the inlet distribution header in a closed-loop configuration, the recycle line comprising a recycle line propulsor controllable by a recycle line controller and a recycle line heat exchanger; and a compressed fluid distribution line configured to pressurize the fluid in motion by transporting a compressed fluid from a compressed fluid source to the inlet distribution header and to the outlet distribution header, the compressed fluid distribution line controllable by at least one pressure controller.

There is also provided a powered augmented fluid turbine for generating electricity from a fluid in motion, the powered augmented fluid turbine comprising: a central annular ducted channel extending between an inlet for receiving the fluid and an outlet for expelling the fluid, the central annular ducted channel comprising a converging section configured to accelerate the fluid received at the inlet, a turbine assembly for generating electricity, and a diffuser section configured to decelerate the fluid before the fluid exits at the outlet; an inlet propulsor for propelling the fluid from the inlet into the converging section, the inlet propulsor controllable by at least one control unit and drivable by a first variable speed motor; an outlet propulsor for propelling the fluid from the diffuser section towards the outlet, the outlet propulsor controllable by the at least one control unit and drivable by a second variable speed motor; a plurality of velocity sensors, each velocity sensor for recording a velocity recording of the fluid in motion at a given point in the powered augmented fluid turbine and sending the velocity recording to the control unit; and a fluid curtain system downstream of the outlet, the fluid curtain system for maintaining the stability of the fluid exiting the outlet.

There is also provided a powered augmented fluid turbine for generating electricity from a fluid in motion, the powered augmented fluid turbine comprising: a central annular ducted channel extending between an inlet distribution header for receiving the fluid and an outlet distribution header for expelling the fluid, the central annular ducted channel comprising a converging section configured to accelerate the fluid received at the inlet distribution header, a turbine assembly for generating electricity, and a diffuser section configured to decelerate the fluid before the fluid exits at the outlet distribution header; an inlet propulsor for propelling the fluid from the inlet into the converging section, the inlet propulsor controllable by at least one control unit and drivable by a first variable speed motor; an outlet propulsor for propelling the fluid out of the diffuser section, the outlet propulsor controllable by the at least one control unit and drivable by a second variable speed motor; a plurality of velocity sensors, each velocity sensor for recording a velocity recording of the fluid in motion at a given point in the powered augmented fluid turbine and sending the velocity recording to the control unit; a recycle line for transporting the fluid exiting from the outlet distribution header to the inlet distribution header in a closed-loop configuration, the recycle line comprising a recycle line propulsor and a recycle line heat exchanger; and a compressed fluid distribution line configured to pressurize the fluid in motion by transporting a compressed fluid from a compressed fluid source to the inlet distribution header and the outlet distribution header, the compressed fluid distribution line controllable by at least one pressure controller.

BRIEF DESCRIPTION OF THE DRAWINGS

FIGS. 12.1-12.3 are schematic drawings showing perspective and longitudinal cross-sectional views of a segmented programmable rotor blade for velocity rectifiers, external energy propulsors, and conventional ventilation-type fans, in accordance with an illustrative embodiment of the present invention;

DETAILED DESCRIPTION OF THE ILLUSTRATIVE EMBODIMENTS

Figure 1A:
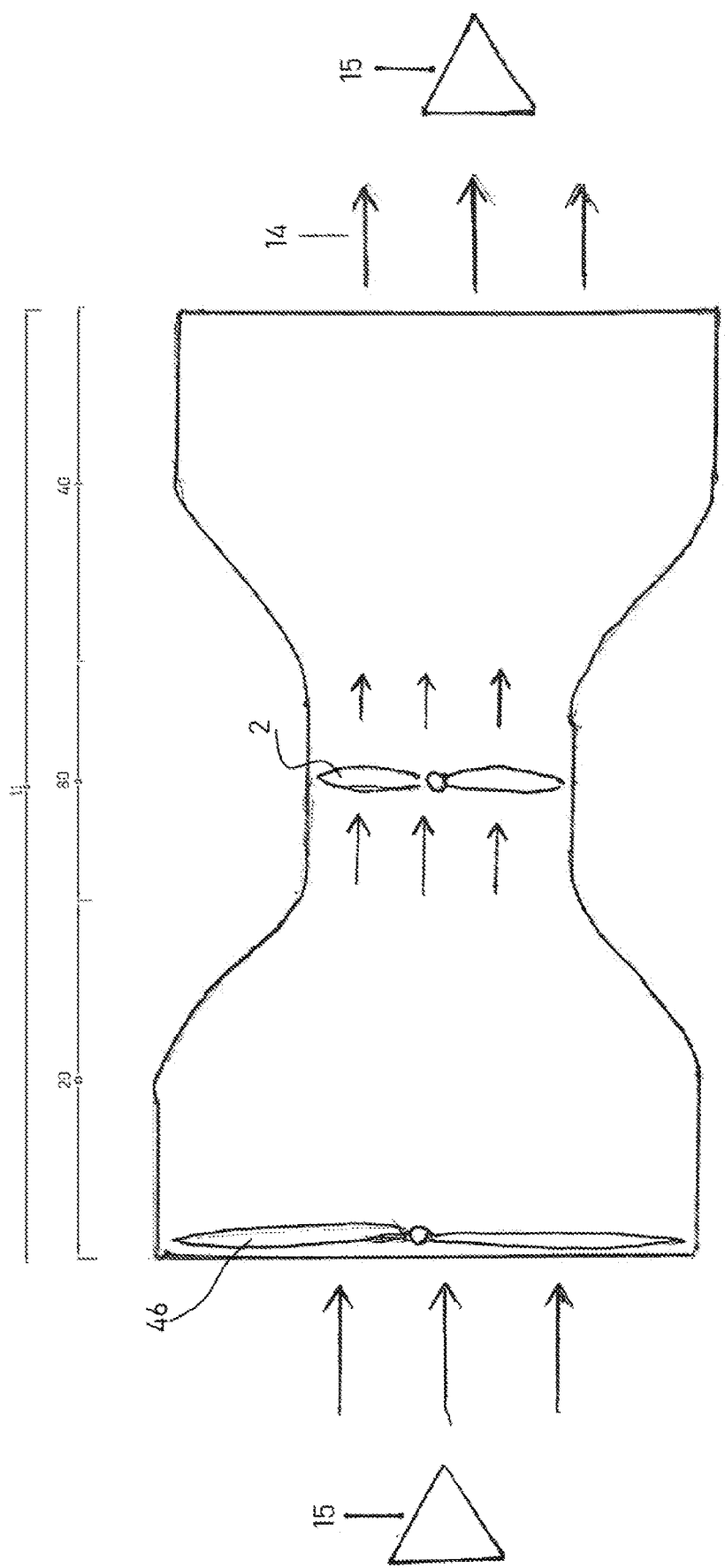
FIGS. 1A, 1B and 2 are schematic drawings showing longitudinal cross-sectional views of examples of existing designs for unpowered augmented wind turbine systems.
Figure 1B:
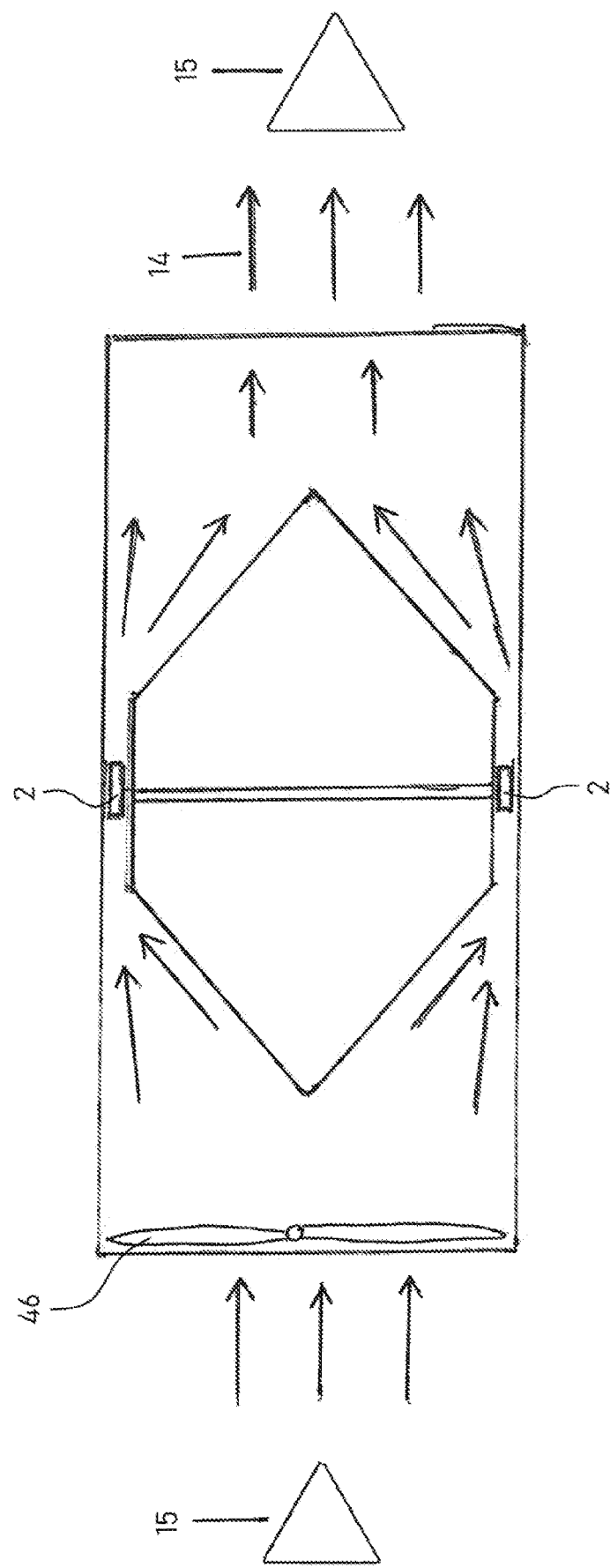

Referring first to FIGS. 1A and 1B, there is shown a plurality of previously attempted arrangements for an unpowered-AWTS. Each unpowered-AWTS comprises a ducted channel 11 comprising a convergent section 20, a turbine assembly 80 comprising for example a single stage rotor 2, and a diffuser section 40. There is a flow stimulator 46 at the entrance of each convergent section to reduce the variability of the wind intake speed to the single-stage rotor 2. Besides increasing or decreasing the speed of the flow stimulator 46, there are no other corrective measures available to improve flow steadiness or early boundary layer separation problems inherent to all unpowered-AWTS designs. As such, the performance of each unpowered-AWTS may be underwhelming. The turbulence created by the geometric shape of the diffuser section 40 will create much downstream turbulence that will disturb the flow condition in the diffuser section's 40 flow stream. The divergence half-angle as the flow enters the diffuser section 40 will be over 40 degrees, and thus early boundary layer separation will occur. By operating the flow stimulator 46 in the convergent section 20, there will be too much push and choked flow will occur. These performance deficiencies are present because no corrective measures by devices or process controls are implemented to reduce the known effects of flow instability and boundary layer separation inherent in the system. As such, these systems are incapable of producing competitive electrical power.

Figure 2:
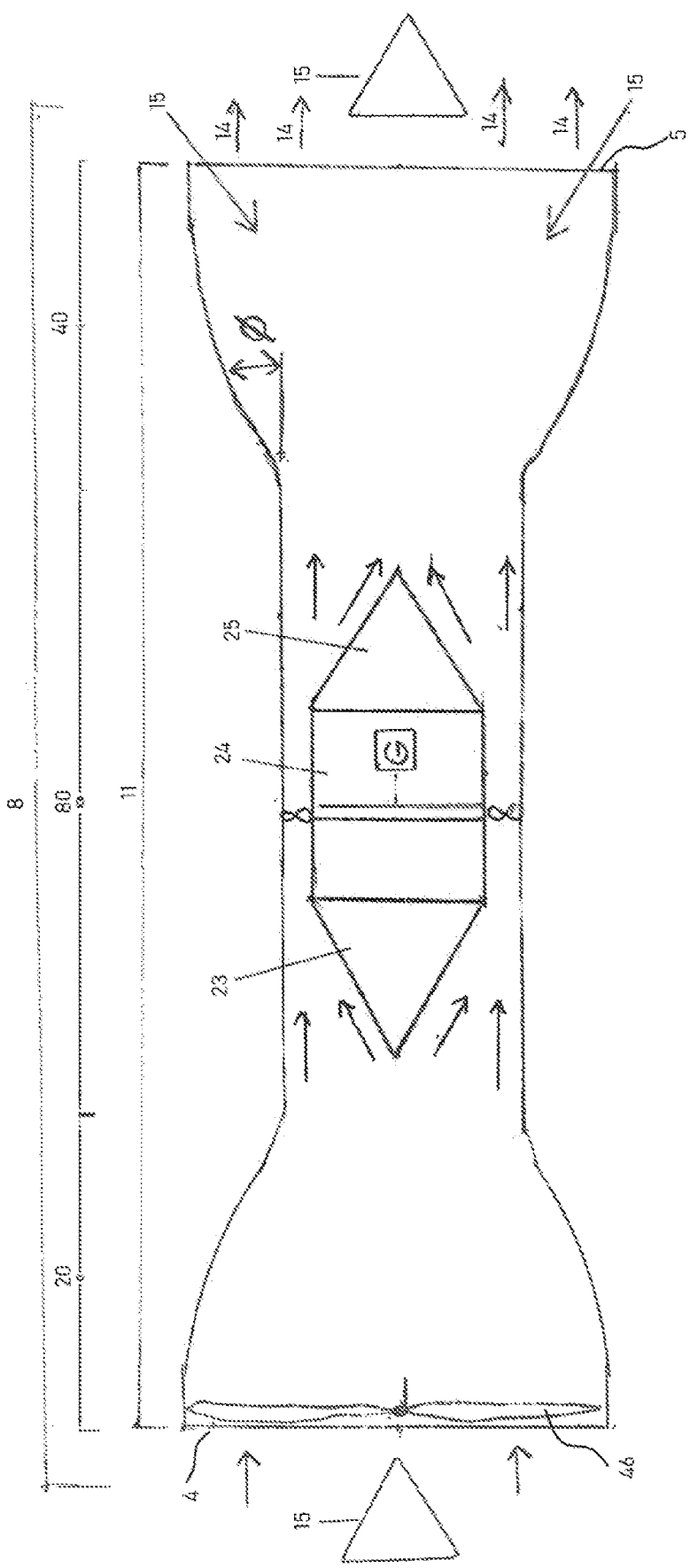

Referring to FIG. 2, an embodiment of the unpowered-AWTS 8 is shown comprising a continuous ducted-channel 11 comprising a convergent section 20 fed by an inlet section 4. The surface area of the convergent section 20 decreases as the flowing fluid 15 passes through such that the flowing fluid is accelerated. The flowing fluid is stabilized as it passes through the inlet 4 and then discharged into a ducted area that contains a flow-stream velocity accelerator 23. The flow-stream velocity accelerator 23 may be shaped in a variety of ways such as conical, cigar shaped, or needle nosed. It gradually reduces the dimensions of the flow area in the ducted channel that in turn, as a person of ordinary skill in the art would understand increases the velocity of the flow stream, as per Bernoulli's law.

Still referring to FIG. 2, the flow-stream velocity accelerator 23 discharges the flowing fluid into a wind turbine 24 that consists of one-stage air-foils mounted on a rotor, wherein the air-foils are rotating in a plane perpendicular to the direction of the flow stream. The velocity of the flow stream develops lift as it flows over the air-foils that in turn rotate the rotor and the turbine is connected to an electrical generator. The flow-stream exiting the turbine assembly 80 enters a velocity decelerator section 25. The velocity decelerator 25 may be shaped in a variety of ways such as conical, cigar-shaped or needle-nosed. The dimensions of the flow area of the velocity decelerator 25 gradually increase, which in turn decreases the velocity of the flow stream. The velocity decelerator 25 discharges into a diffuser section 40 before exiting at an outlet 5. The diffuser wall at its inlet creates a divergence half-angle which will create a problem of early-BLS.

Still referring to FIG. 2, the diffuser 40 gradually increases in cross sectional area until at its discharge where a larger open surface area is discharging a large radius flow-stream 14 directly into a downstream/trailing wind flow 15. The axial wind flow velocity 15 is higher than the axial velocity of the diffuser discharge 14 that creates an inflow of trailing wind into the diffuser outlet 5. It is impossible for the discharge velocity 14 to be higher than the trailing wind flow 15 as energy is being extracted at the wind turbine 24, friction losses are incurring along the walls of the ducted-channel 11, and part of the axial flow-stream 14 is converted into radial flow-stream by the wind turbine 24. Further, unpowered-AWTS's 8 such as this one were never designed to operate with a fluid/air-curtain.

Figure 3:
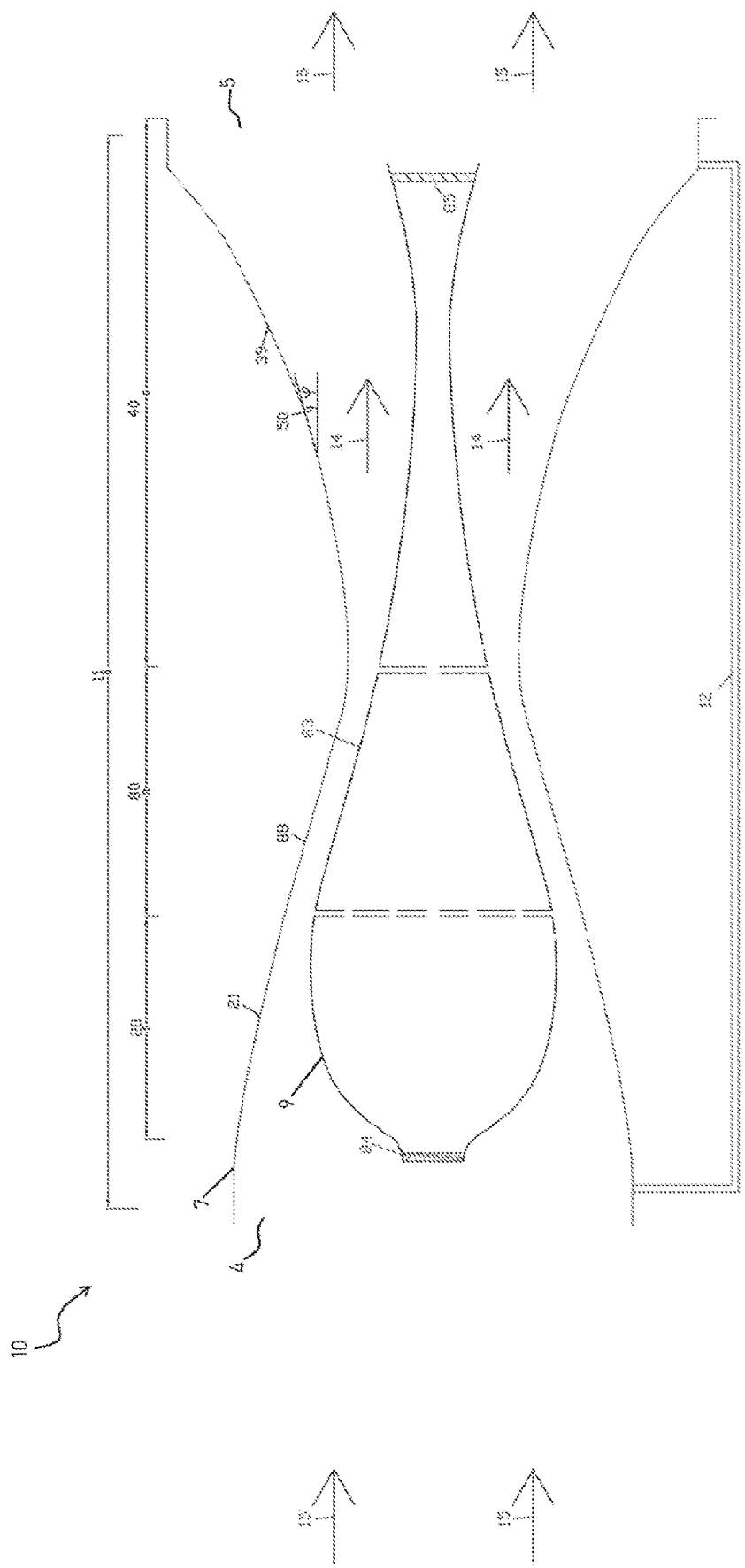
FIG. 3 is a schematic drawing showing a longitudinal cross-sectional view of a powered augmented fluid turbine, in accordance with an illustrative embodiment of the present invention.

Referring now to FIG. 3, there is shown an embodiment of a powered augmented flow turbine (PAFT), generally referred to by the reference numeral 10. PAFT 10 may also be referred to as a hyper-augmented fluid turbine. The PAFT 10 comprises a central annular ducted channel 11 extending between an inlet 4 for receiving the fluid and an outlet 5 for expelling the fluid, the central annular ducted channel 11 comprising a converging section 20 configured to accelerate the fluid received at the inlet 4, a turbine assembly 80 for generating electricity, and a diffuser section 40 configured to decelerate the fluid before the fluid exits at the outlet 5. The outer-wall 7 of the ducted channel is divided into three sections: a convergent section outer-wall 21, a turbine outer-wall 88, and diffuser section outer-wall 39. A critical divergent half-angle 50 is formed between the diffuser section outer wall 39 and the direction of the flow-stream 14 is it flows from the turbine assembly 80 to the diffuser section 40. In an embodiment, the continuous inner-wall 9 of the ducted channel 11 is in the form of a whale and creates an enclosure with an air intake louver 84 facing upstream and an air outlet louver 85 facing downstream. These louvers 84, 85 serve to allow cooling air to circulate through the enclosed area.

Still referring to FIG. 3, the contours of inwardly curving inner-wall 9 and outer-wall 7 are of great importance to the efficiency of the PAFT 10. For optimal performance, the angle of attack of the walls is limited to a maximum of 5 degrees. With operating wind flow-stream velocities starting at 42 m/s, increasing the rate of change will lead to a higher propensity for early-BLS. Further, using a low rate of change decreases friction losses and creates a high level of aerodynamic efficiency that is important throughout the PAFT 10 but particularly in the diffuser section 40. The distances between the inner and outer-walls establishes the level or ratio of compression or decompression at that point. The rate of change of the distance between the channel-walls 9 at any point in the PAFT 10 will also affect the aeronautic efficiency of all components. As such, the rate of change of the diameter over the length or slope of the ducted channel walls, in particular at the transitions between the various sections, is as low as possible, and should be less than 5 degrees.

Still referring to FIG. 3, in an embodiment, the inner-wall of the turbine-rotor section 83 rotates as part of the turbine assembly 80 and is not directly connected to the adjacent stationary walls. A seal is created between the rotating and non-rotating sections of the inner wall 9 to prevent air flow from the ducted-channel 11 into the components of the turbine assembly 80. The outer-walls of the ducted-channel 7 are attached to a turbine outer frame 12.

Still referring to FIG. 3, the compression and augmentation ratios inside the PAFT 10 have a large impact on its efficiency and capacity, and as a result on its cost of production/kWh. For a PAFT 10 operating with wind, the respective interdependent ratios between the 3-annular sections and are described as follows, whereby A1 is the surface area of the convergent inlet, A2 is the swept area of the first stage rotor, A3 is the swept area of last stage rotor, and A4 is the diffuser discharge surface area: A1/A2=3.5 minimum, A4/A3=3.5 minimum, A2/A3=4 minimum, A4/A1=0.25 average.

FIGS. 3 to 11 depict various embodiments of a PAFT 10 operating in an open loop, free-flow mode, whereby the fluid in question, for example air, passes through the PAFT before being discharged to the surroundings, for example to the atmosphere. An alternate embodiment of a PAFT, as will be described later in reference to FIGS. 14A and 14B, operates in a closed loop, recycle mode, whereby the fluid exiting the PAFT 10 is returned to the inlet to be used again.

Figure 4:
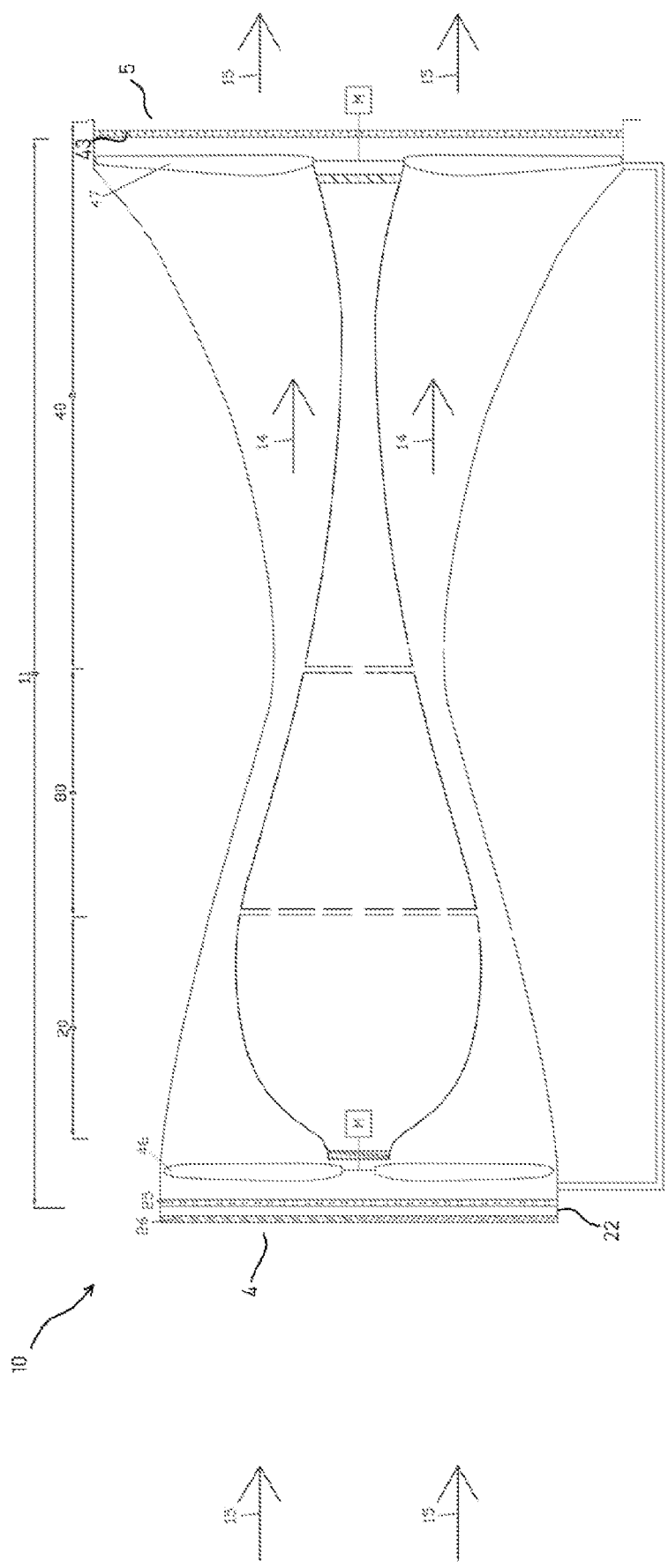
FIG. 4 is a schematic drawing showing a longitudinal cross-sectional view of a powered augmented fluid turbine comprising synchronized inlet and outlet propulsors, in accordance with an illustrative embodiment of the present invention.

Referring now to FIG. 4, in an embodiment, PAFT 10 comprises a set of components designed to obtain and accommodate high energy densities at the turbine assembly 80. An inlet-propulsor unit 46 is located at an inlet 4 to the convergent section 20 and an exhaust-propulsor unit 47 is located at an outlet 5 of the diffuser section 40. Each propulsors 46, 47 is motorised by respective variable speed motor M. As such, the injection of energy from propulsors 46, 47 is distributed as evenly as possible to the flow-stream 14 over the surface area of the convergent inlet 4 and over the surface area of the diffuser outlet 5 to contribute to maintaining a required steady and stable axial cross-sectional flow velocity in the diffuser section 40. The push generated by the combined energy of the incoming feed stream 15, the inlet-propulsor 46 and the convergent compression ratio all need to be correctly balanced against the pull generated by the combined energy of the turbine assembly's 80 momentum recovery, the exhaust-propulsor 47, the diffuser section 40 decompression ratio and the outgoing axial discharge stream 15. By adjusting the speed and pitch angle of the blades of the two propulsors 46, 47, one can obtain a finer control over the cross-sectional flow-stream velocity. In an embodiment, a blade with programmable pitch may be used. The main purpose of the two propulsors 46, 47 is to augment the entire flow-stream velocity. At higher flow velocities, the flow disturbances are smaller in size and dissipate more rapidly, so overall turbine efficiency increases.

Still referring to FIG. 4, in an embodiment, a fluid brake 22 comprising a motorised louver 26 and a fluid filter 25 to remove debris and dust particles that may erode the blades of the rotor at the high flow-stream speeds is installed upstream of the inlet propulsor 46. The fluid brake 22 is used to prevent rotor overspeed, which would otherwise occur if very high fluid velocity is simply entering into the flow-stream at the convergent inlet 4. In an embodiment, the fluid brake 22 comprises an air brake and the filter 25 comprises an air filter. As a skilled person in the art would understand, as an alternative configuration, multiple small propulsors could be mounted on a frame that seals off the surface areas of the convergent section 20 and the diffuser section 40 that are not directly in front of the propulsors suctions. In this configuration, each propulsor would have a variable speed drive and independent pitch control. Accordingly, propulsors located closer to the circumference of the diffuser section 40 discharge can add more velocity as compared to the remaining flow areas that maintained sufficient velocity. These propulsor units can also be used to rectify or redistribute the cross-sectional flow-stream velocities but the main function of a propulsor unit is injecting energy/velocity into the flow-stream.

Figure 5:
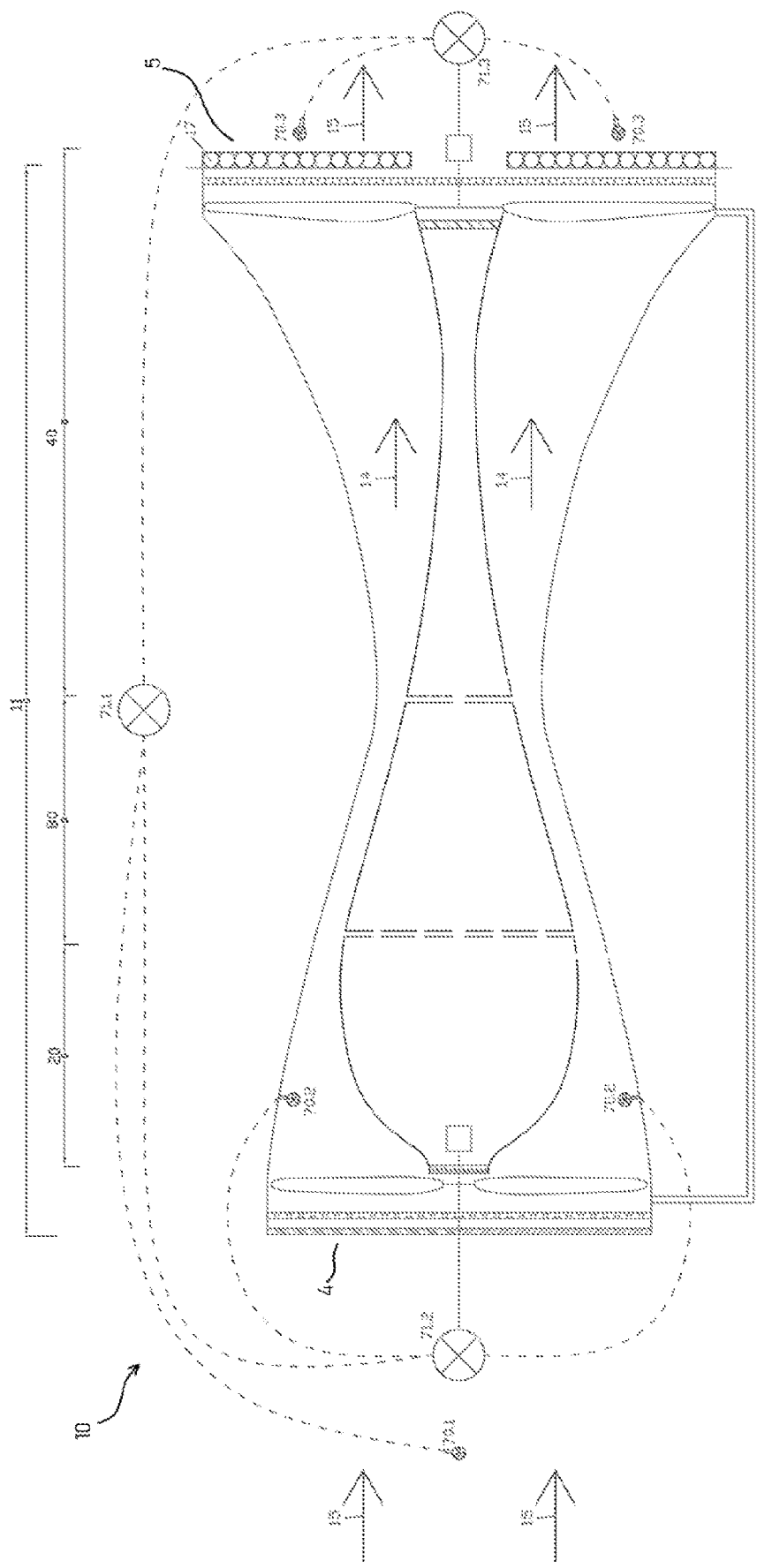
FIG. 5 is a schematic drawing showing a longitudinal cross-sectional view of a powered augmented fluid turbine comprising a plurality of air velocity measurement devices and closed-loop process controls, in accordance with an illustrative embodiment of the present invention.

Referring now to FIG. 5, in an embodiment, a process control management system may be used to create a fluid curtain system 17 over the face of the diffuser outlet 5 to maintain the stability of the flow despite the variability caused by the system components upstream and by the trailing winds. The fluid curtain 17 effectively isolates the turbulence of the downstream flow stream from the flow-stream within the diffuser section 40, thus improving the efficiency (pull) of the diffuser section 40 and thus the efficiency of the PAFT 10. In an embodiment, the fluid curtain system 17 comprises an air curtain.

Still referring to FIG. 5, without closed loop control of the rates of injection of energy by both the inlet and exhaust-propulsor units 46, 47, flow-stream unsteadiness may be aggravated rather than mitigated. The proper control of the injection of energy in a PAFT 10 requires accurate measurement of cross-sectional flow-stream velocities (both axial and rotational). These measurements are made by sensors downstream of the two points of injection but, as a skilled person in the art will know, the desired level of control may require the addition of additional control loops and measurement points that provide additional feedback to the control system, for example blade pitch-angle controls, generator and power output controls, etc.

Still referring to FIG. 5, based on measurements of flow-stream velocities, three process control units 71.1, 71.2, 71.3 adjust the levels of energy injection into the turbine flow-stream 14 by adjusting the speeds and pitch angle at the propulsor units 46, 47. The required situation exists when a stable fluid curtain 17 has been established over the face of the diffuser outlet 5. The axial velocity of the flow-stream in the fluid curtain 17 will always be held higher than the axial velocity of the flow stream 15 into which it is being dissipated. There are three main control loops. The first process control unit 71.1 receives measurements from a velocity measurement sensor 70.1 located upstream of the convergent inlet 4. The second process control unit 71.2 receives measurements from velocity measurement sensors 70.2 located downstream of the inlet 4. The third process control unit 71.3 receives measurements from velocity measurement sensors 70.3 located within the fluid curtain 17. Given the variability in upstream and downstream wind conditions, without these controls of external energy injection, the operating efficiency of the PAFT 10 would be severely jeopardised.

Figure 6:
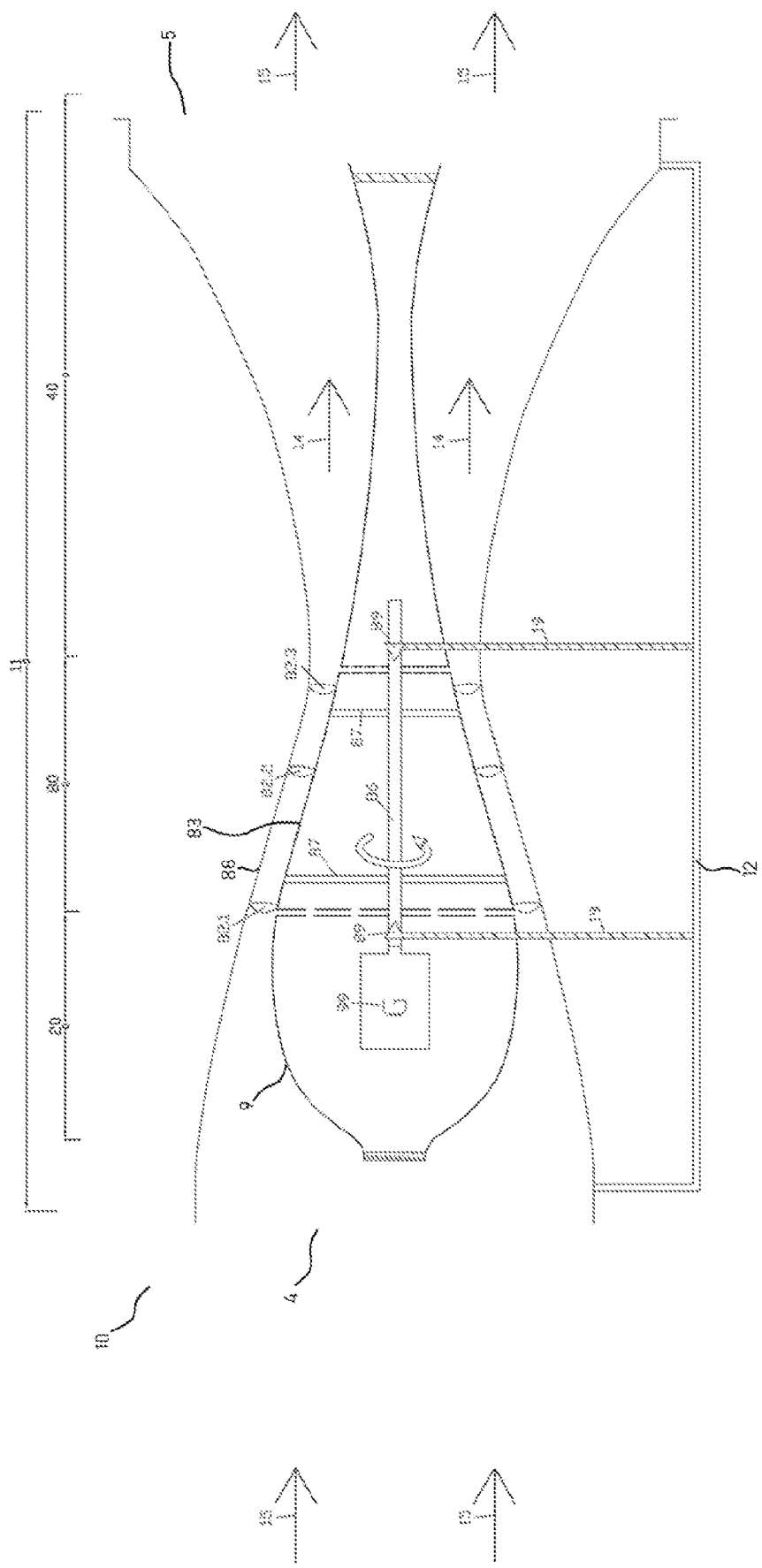
FIG. 6 is a schematic drawing showing a longitudinal cross-sectional view of a powered augmented fluid turbine comprising a multi-stage turbine assembly, in accordance with an illustrative embodiment of the present invention.

Referring now to FIG. 6, in an embodiment, the turbine assembly 80 comprises a plurality of annular rotors 82, illustratively a three-stage turbine-rotor comprising first-stage blades 82.1, second-stage blades 82.2 the third-stage blades 82.3. The turbine assembly 80 is a one-piece unit whereby the three stages of blades 82.1, 82.2, 82.3 are mounted on a common, continuous, inner rotating wall 9 connected to a central rotating shaft 86. The rotating shaft 86 is supported by two bearings 89, one in the convergent section 20 and the other in the diffuser section 40. The vertical and horizontal forces exerted on the turbine assembly 80 are transferred to the outer frame 12 by supports placed to pass through the two stationary sections of the inner-wall 9.

Still referring to FIG. 6, the inter-stage re-acceleration of the flow-stream is crucial to efficient energy extraction. As illustrated in FIG. 6, the inner 83 and outer 88 walls of the turbine section 80 both form an annular cone with its inlet surface area larger than its outlet surface area. The body of the cone may take several shapes. For example, with a straight-walled cone, a decreasing swept area of the succeeding rotor stages is obtained by progressively decreasing, by equal amounts, the distances between the inner 83 and outer 88 walls and the center line of the rotating shaft 86 and the distance between the walls remains constant. As a skilled person knowledgeable in the art would understand, the required decrease in the swept area of the rotor stages can also be obtained by maintaining constant distance between the outer wall 88 and inner wall 83 of the rotating shaft 86 and by gradually decreasing the distance between the two walls. This, however, would require the blades 82.1, 82.2, 82.3 to have shorter lengths. In an alternative embodiment, the distance between the walls may be held constant, forming a cylinder shape. In this embodiment, shorter blades 82.1, 82.2, 82.3 would be mounted on both inner and outer circular rims that serve to stabilize their position and to better distribute the moments created over the face of the blades by the moving fluid. The length of the blades at each stage are used to calculate the respective swept areas.

Still referring to FIG. 6, as a skilled person in the art would understand, the rotation of the rotor blades 82.1, 82.2, 82.3 in the ducted-channel 11 will impart a rotational velocity to the mass of the flow-stream 14. As such, in an alternate embodiment, stationary vanes (not shown) installed on the outer-wall 88 of the turbine assembly 80 before or after each stage of rotating blades would eliminate much of the rotation before reaching the next set of blades.

Still referring to FIG. 6, the rotating shaft 86 of the turbine assembly 80 drives an electrical generator 99. A skilled person in the art would understand that a constant-speed generator offers advantages in power quality and efficiency over variable-speed generators. Constant-speed generators normally have constant flow-stream velocities, such as delivered by power dams and steam generators, as otherwise the efficiency of the process of converting torque to electrical power will vary. While the PAFT 10 may be configured to operate with a variable speed rotor turbine, in a preferred embodiment, electrical generator 99 comprises a constant speed generator.

Figure 7:
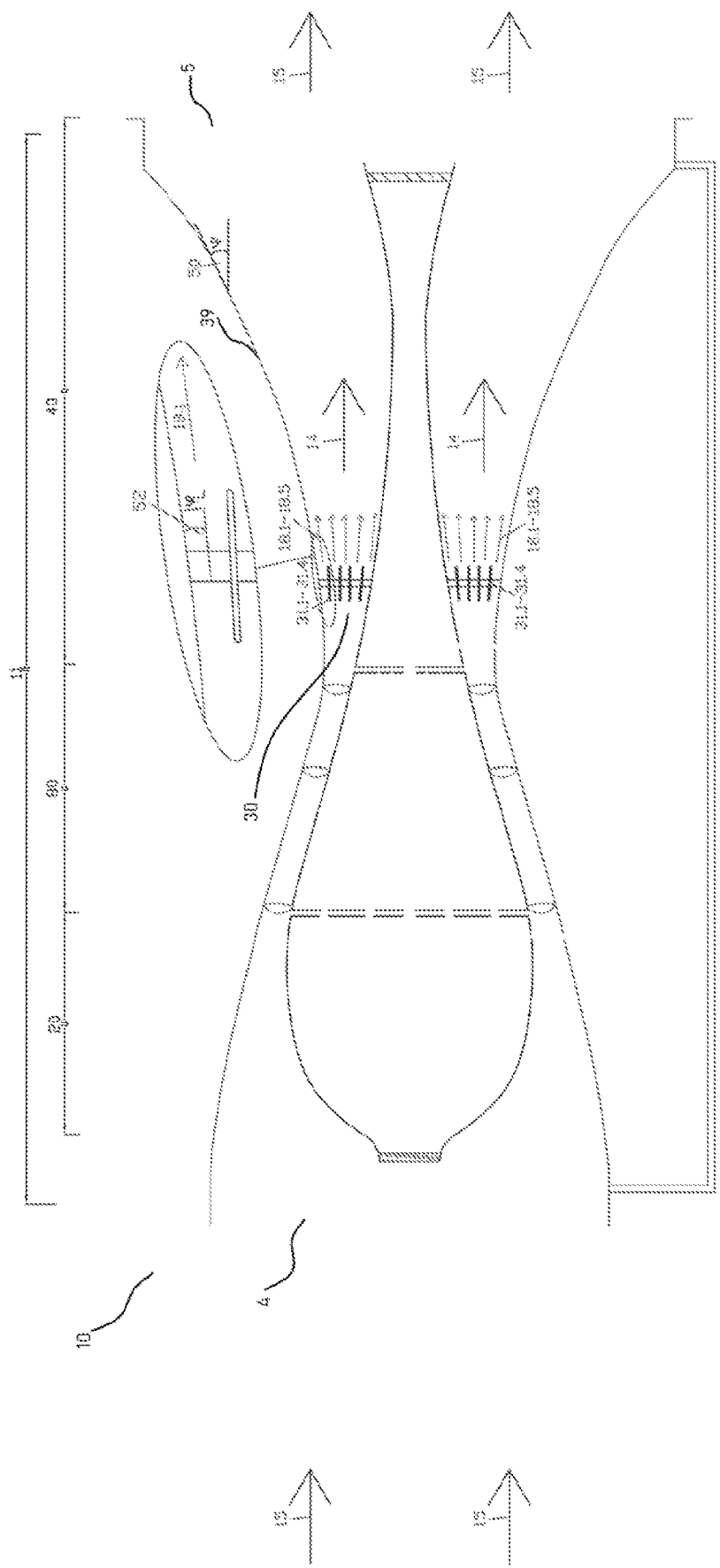
FIG. 7 is a schematic drawing showing a longitudinal cross-sectional view of a powered augmented fluid turbine comprising a flow distributor located at the inlet of the diffuser section, in accordance with an illustrative embodiment of the present invention.

Referring now to FIG. 7, in an embodiment, a flow stream distributor 30 comprising a plurality of air foils 31.1-31.4 is employed where the ducted channel 11 transitions from the exhaust of the turbine assembly 80 to the inlet of the diffuser section 40. At this point in the ducted-channel 11, the divergence half-angle 50 is created and normally presents the flow pattern with the highest risk of generating early-BLS. If early-BLS starts at the entrance to the diffuser section 40, the result is large losses in both system and diffuser efficiency. In this embodiment, the flow-stream 14 exiting the turbine assembly 80 feeds into the flow stream distributor 30 located slightly upstream or downstream of the inlet of the diffuser section 40 and covers the entire surface area of that part of the ducted channel 11. The flow stream distributor 30 divides the entering mass flow-stream 14 into a multitude of smaller, distinct flow streams 18.1-18.5. The surface area and direction of each flow-stream 18.1-18.5 at its discharge may vary to provide the best distribution profile within the diffuser section 40.

Still referring to FIG. 7, each distinct flow-stream 18.1-18.5 has its own distinct discharge orientation to ensure that the flow over the diffuser cross-section is as uniform as possible. However, the illustrated distinct flow-streams 18.1-18.5, which are basically the two sides of the same circular stream, are both adjacent to the opposite sides of the circular-annular diffuser walls. These flow-streams discharges 18.1-18.5 can thus be oriented to obtain a new effective divergence half-angle 52 that now reflects the angle established by the face of the outer diffuser wall 39 and a line parallel to the adjacent flow-stream discharge. As such, the divergence half-angle 50 for a flow-stream without a flow distributor may measure 10 degrees but the effective divergence half-angle 52 between the diffuser wall 39 and the distinct adjacent flow-streams 18.1-18.5 may measure only 2 degrees. A skilled person in the art would understand that the diffuser inlet flow stream distributor 30 may take several forms. It may be a restrictive plate with drilled, angular orifices, or the plate may have mounted, oriented nozzles, or it may simply a series of airfoil profiles, parallel to the flow, with or without compartmentation (as illustrated in FIG. 7). Given that PAFT 10 applications are based on flow-stream velocities of 42 m/s or higher, the ability to use a flow stream distributor 30 to reduce the divergence half-angle 50 is critical for attaining the functional objective of competitive electrical power.

Figure 8:
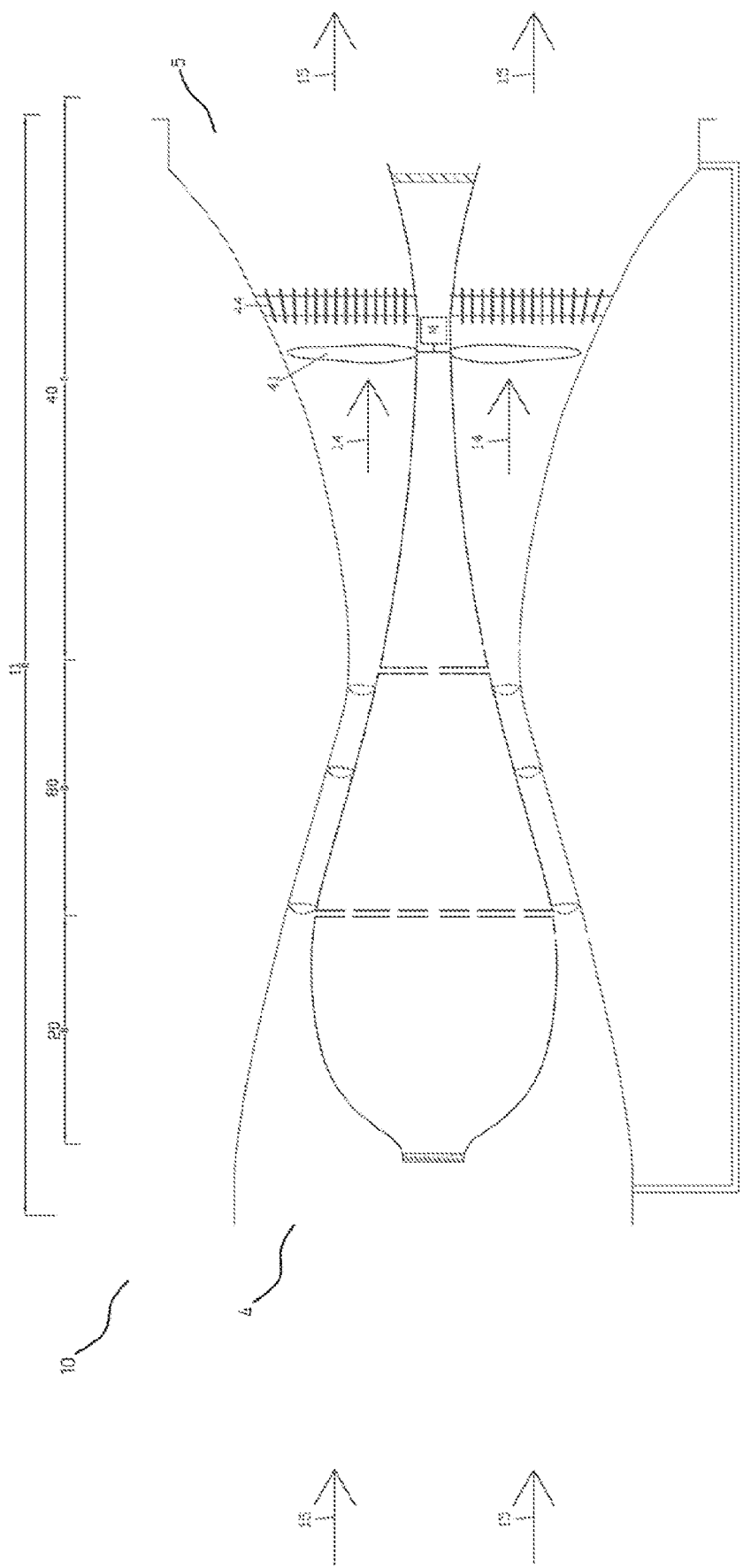
FIG. 8 is a schematic drawing showing a longitudinal cross-sectional view of a powered augmented fluid turbine comprising at least one velocity rectifier in the diffuser outlet, in accordance with an illustrative embodiment of the present invention.

Referring now to FIG. 8, in an embodiment, one or more velocity rectifiers 41 located in the diffuser section 40 are used to inject limited external energy to the areas of the flow-stream 14 that are losing energy due to friction losses, the onset of flow instability, or early-BLS. As the role of a diffuser is to progressively decrease the flow-stream velocity, variable flow-stream velocities are inevitable, thus creating a need for velocity rectifiers. Each velocity rectifier 41 comprises of a low intensity rotating blade that covers the entire surface area of the diffuser section 40 at its given location. To accomplish rectification, the cross-sectional velocity of the flow stream discharging from the diffuser section 40 to the atmosphere is measured and the rotating blades of each velocity rectifier 41 would add specific amounts of energy to the flow stream at specified positions. While FIG. 8 depicts one velocity rectifier 41, a plurality of velocity rectifiers 41 may be installed, such a number varying based on the size of the diffuser section 40, the amount of energy to be added to the flow, and the degree of flow instability.

Still referring to FIG. 8, each velocity rectifier 41 may include a section of stationary outlet guide vanes 44 installed to avoid a rotating flow-stream. Referring additionally back to FIG. 4, an additional velocity rectifier 43 with a different vane configuration may be installed after the diffuser propulsor 47 and its discharge would form the air curtain 17. This additional velocity rectifier 43 assists the air curtain 17 in isolating the cross-sectional flow variations from the trailing wind and serves for considerations of safety and noise abatement.

Still referring to FIG. 8, as a skilled person in the art would understand, several configurations of rotating blades with different pitch angles could be applied to the rectification process. Although most configurations will improve the flow stability within the diffuser section 40, the level of improvement will vary, and certain blade configurations may be superior for certain sizes of diffusers. A single, standard 3-bladed rotor, with variable pitch blades and driven from a central shaft that sweeps the entire discharge area of the divergent section 40 will be amongst the most inexpensive but not necessarily the most efficient apparatus. Rotating blade rectifiers can be equally used in conical and annular diffusers. As an alternative, blades can be attached to a rim that matches the diameter of the diffuser exhaust to create a rotor that is driven through the rim.

Figure 9:
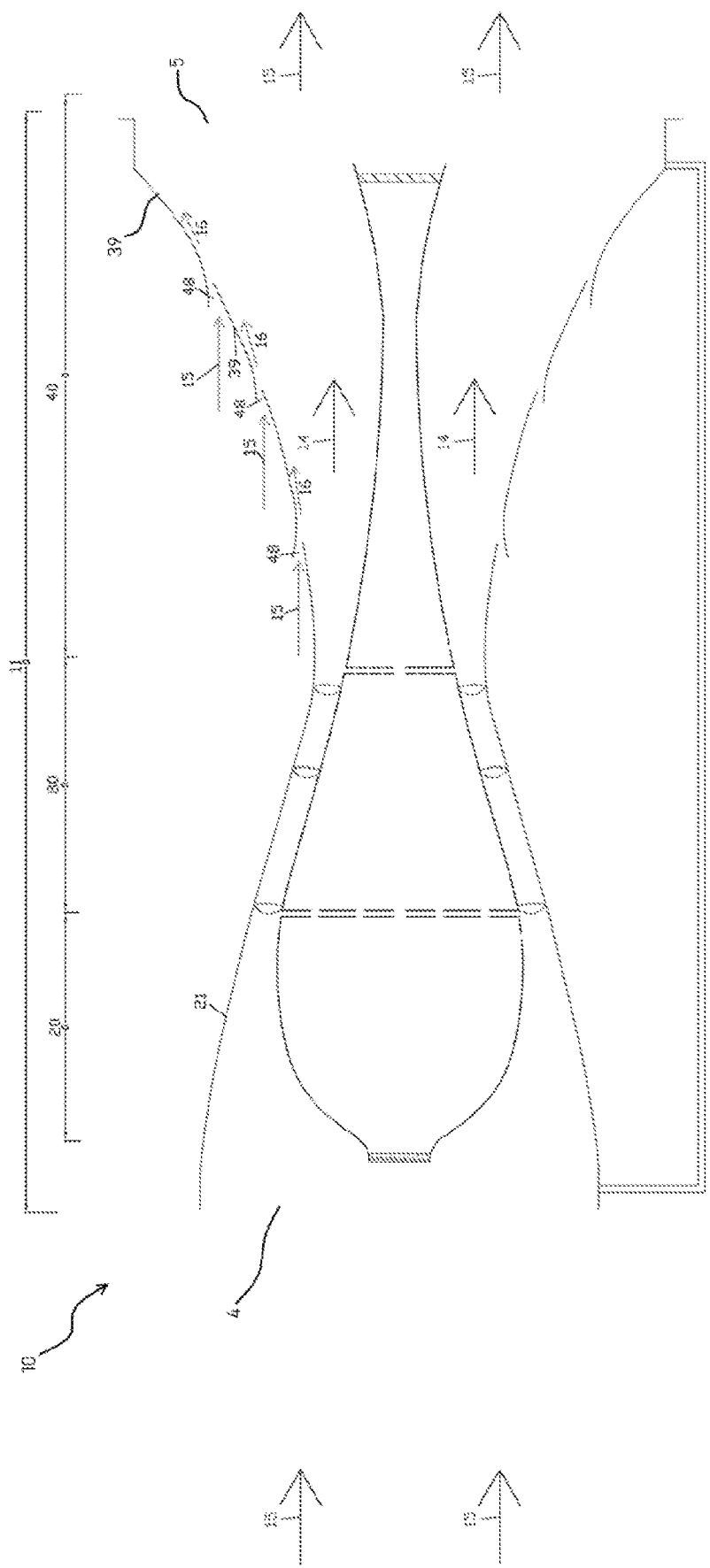
FIG. 9 is a schematic drawing showing a longitudinal cross-sectional view of a powered augmented fluid turbine comprising a plurality of boundary layer velocity rectifying nozzles injecting energy into the diffuser through slots in the diffuser wall, in accordance with an illustrative embodiment of the present invention.

Referring now to FIG. 9, in an embodiment, an external energy injection system is used to re-energize the boundary layer along the walls of the ducted-channel 11 and more particularly the diffuser wall 39 where flow-stream wall velocities are lowest. The area of the inlet of the diffuser section 40 is smaller than the area of the outlet 5 and thus the flow stream velocity drops gradually as it progresses towards the outlet 5 where it is discharged to the atmosphere. There will be a boundary layer flow that sets up along the inside wall 39 of the diffuser section 40 and there will be friction losses that will slow down the outer layer of the boundary layer adjacent to the diffuser wall 39. If the velocity or Reynolds number of the boundary layer flow reaches a point where stall conditions begin, the efficiency of the diffuser section 40 will be affected. As such, re-energizing the boundary layer of the diffuser wall 39 remains a critical element in achieving high efficiencies within the diffuser section 40. It is necessary to compensate for the friction losses along the interior walls in large diffusers for commercial wind power applications. This implies calculating and evaluating the outer boundary layer velocity and thickness around the wall circumference and bringing correctives for conditions that lead to the onset of separation. The thickness of the boundary layer is measured in fractions of inches, but this is the area where most stall conditions will initiate. The second major source of stall is flow instability and perturbations from the diffuser discharge.

Still referring to FIG. 9, in this embodiment, the external energy injection system comprises slotted openings 48 in the diffuser wall 39 that are fed by a converging nozzle or ejector (not shown) that extends over the full length of each slotted opening 48. Selected locations along the length of the diffuser section 40 are identified as having a potential for early-BLS. The acceleration created by the prevailing wind 15 traveling over the exterior wall 39 and the negative pressure that exists inside the diffuser section 40 will produce an accelerated air jet 16 along the inside of wall 39 in the direction of the flow-stream 14. This injection of external energy will thus re-energise the boundary layer.

Figure 10:
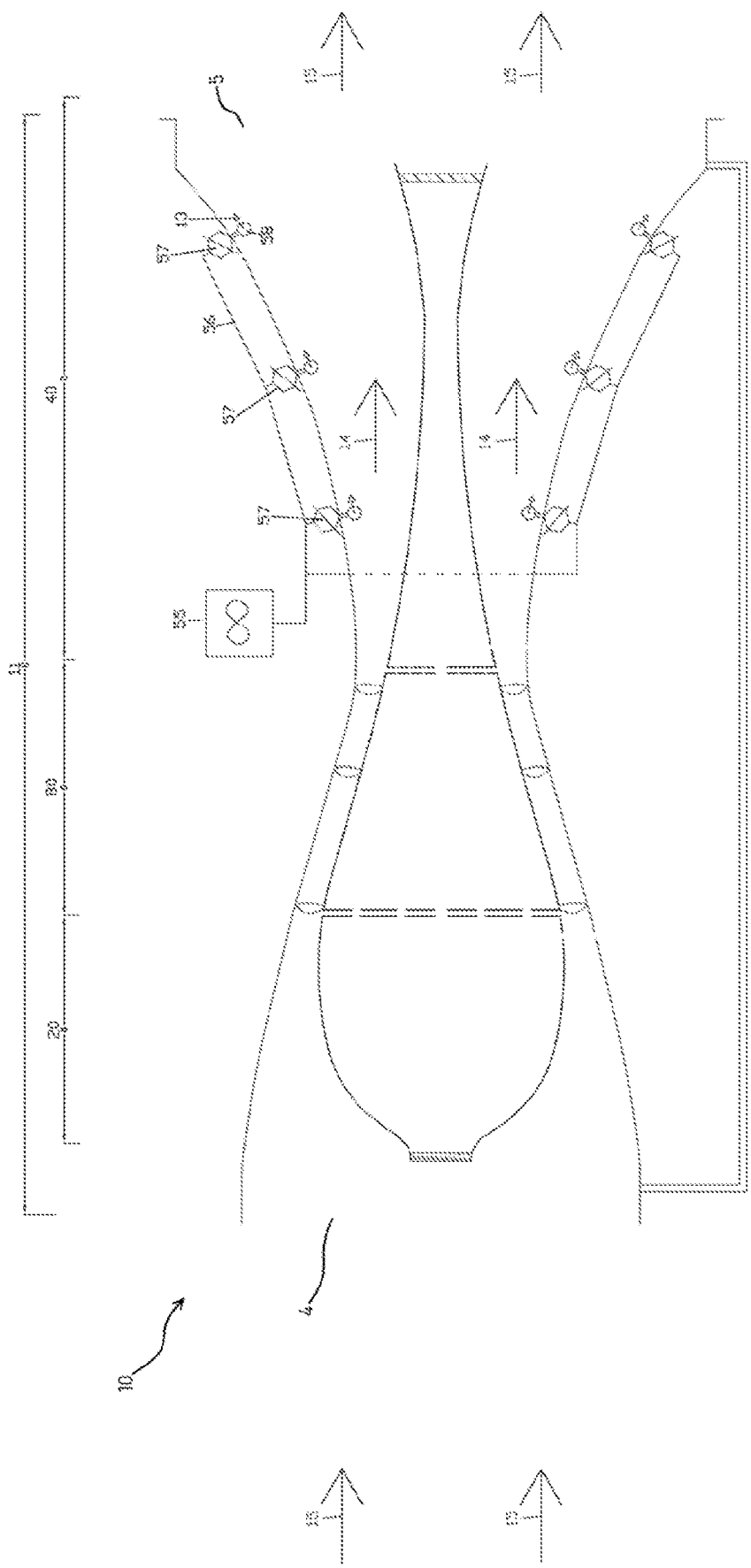
FIG. 10 is a schematic drawing showing a longitudinal cross-sectional view of a powered augmented fluid turbine comprising a plurality of pressurized fluid inlets distributed along an inner sidewall surface of the diffuser, in accordance with an illustrative embodiment of the present invention.

Referring now to FIG. 10, in an embodiment, the external energy injection system re-energizes the boundary layer by injecting pressurized air into the diffuser section 40. External energy injection system comprises a plurality of pressurized nozzles 58 mounted around the diffuser section 40 circumference wall 39 such that high velocity air 13 may be injected tangentially and parallel to the boundary layer flow stream to increase its velocity. A fluid such as air will be pressurized mechanically by a fan 55 and distributed to the nozzles 58 mounted on the exterior of the diffuser wall 39 by a pressurized manifold 56. The flow from the individual nozzles 13 will be equipped with volume control 57. Velocity measurements along the wall surface 39 will indicate flow velocity variants and confirm sufficient external energy transfer.

Figure 11:
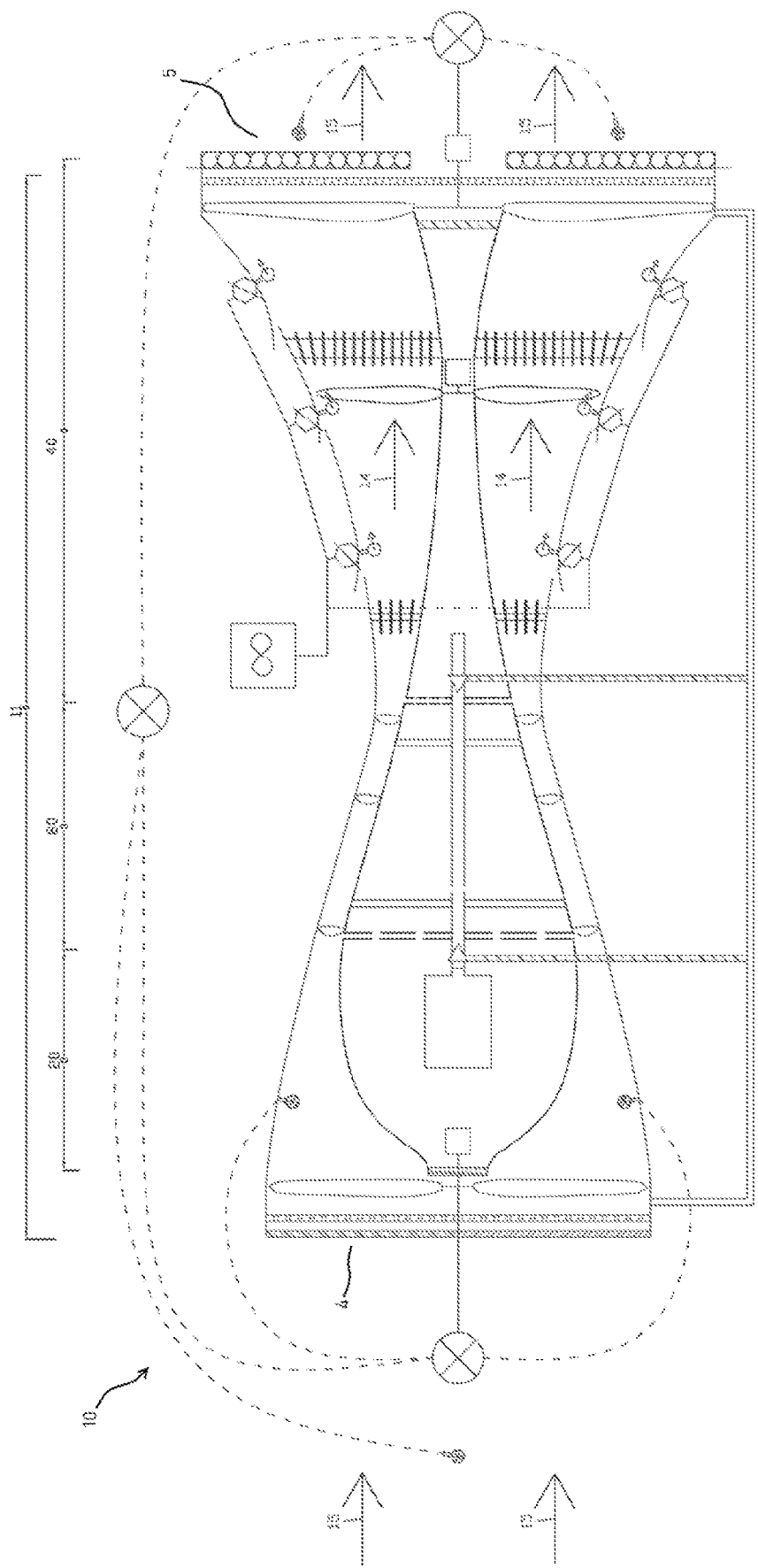
FIG. 11 is a schematic drawing showing a longitudinal cross-sectional view of a powered augmented fluid turbine comprising a combination of the features shown in FIGS. 3-10, in accordance with an illustrative embodiment of the present invention.

Referring now to FIG. 11, there is shown a PAFT 10 comprising all of the features shown in FIGS. 3 to 10 and described above. The implementation of such features modifies an unpowered-AWTS into a PAFT operating efficiently and effectively. The addition of appropriate, balanced external energies to the incoming air stream flows, employing input process controls, successfully controlling BLS over the inner surfaces of the ducted-channel, and achieving a scalable solution for augmentation coupled with an efficient, multi-stage, constant speed turbine-generator allows for the production of competitive electrical power.

Referring now to FIGS. 12.1, 12.2 and 12.3, there is shown a segmented, programmable pitch blade 60 allowing for uniform flows using velocity rectifiers and can also be used as the blades of the feed and exhaust fans for injecting energy into the flow-stream. Ideally, the rotor blades for rectifying velocity are segmented along their length with an independent control of the pitch of each segment in order that on each rotation varied amounts of energy can be applied to the flow stream based on a positioning using both radius and circumference. Air-foils that have been extruded and cut into segments 61 are mounted on their own independent rotary actuator 63 that adjusts their pitch angle. Multiple, short, air-foils are mounted side by side on a common shaft 62 to create a segmented blade 60, and the segments may be of the same profile or of a different profile. The assembled blades are long enough to sweep the entire cross-section anywhere in the circular sections of the ducted-channel. The key advantage of this new type of segmented blade is understandable. If the measured flow stream velocity indicates a variance at 55% of the radius at the 12 o'clock position, this is precisely where incremental energy can be added at each revolution. As the units may be accelerating only part of the flow-stream, the energy requirements should be low, and part of the energy added will be recovered as recovered momentum. The blades 60 will be mounted on a shaft 66 driven from a central axis located in the middle of the diffuser exhaust (as shown in FIG. 12.3) or be connected to a rim that closely matches the diameter of the diffuser outer wall 39 (as per FIG. 12.2). The blades are then driven from the outside by rotating the rim.

Figure 13:
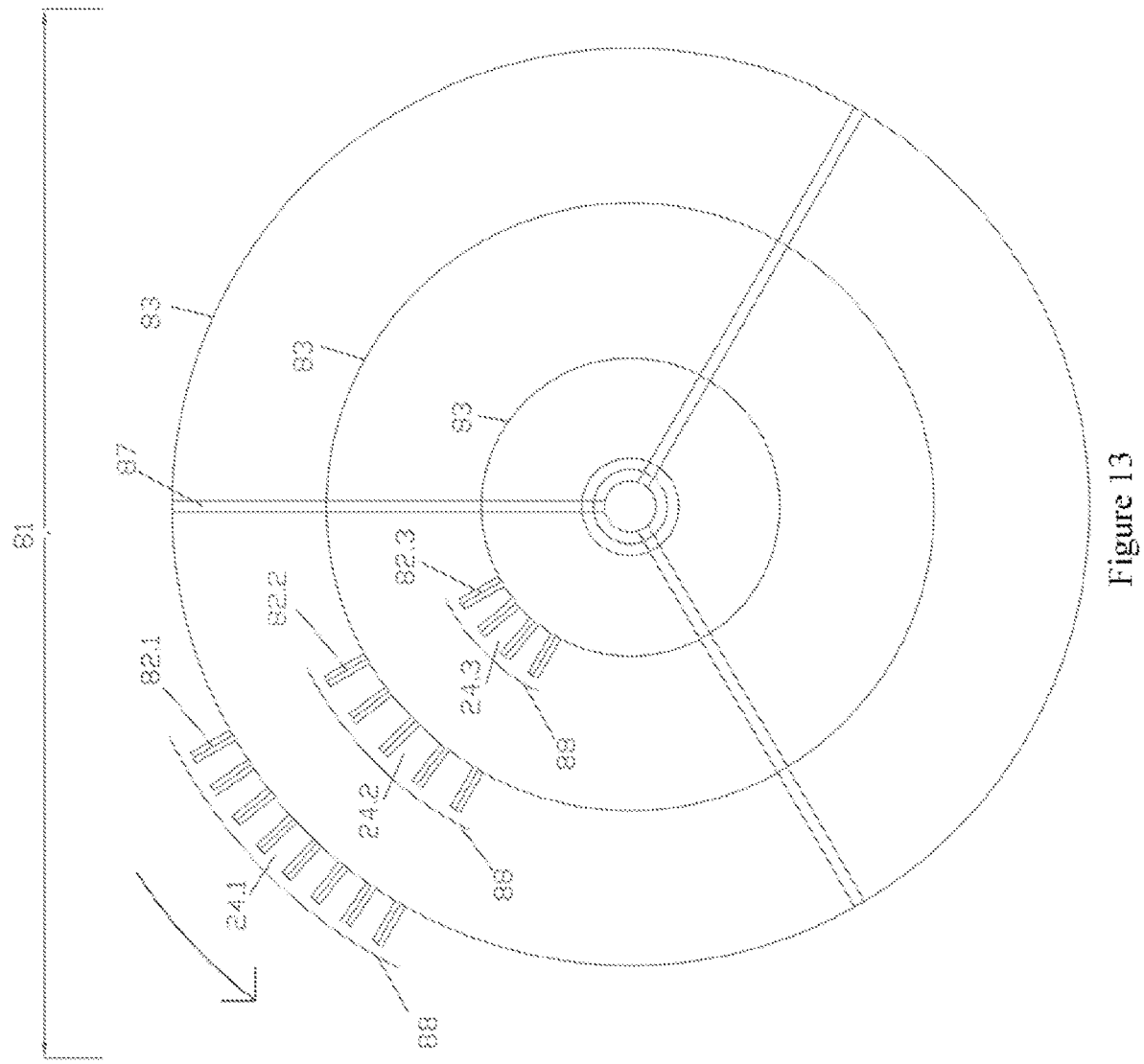
FIG. 13 is a schematic drawing showing an end view of an annular multi-stage turbine assembly for a powered augmented fluid turbine, in accordance with an illustrative embodiment of the present invention.

Referring now to FIG. 13, in an embodiment, an annular ducted channel rotary assembly 81 is shown comprising a multi-stage (illustratively a three stage), turbine assembly 80. The three stages of blades are identified as 82.1-first stage, 82.2-second stage and 82.3-third stage, and are joined by connecting rods 87. Each stage is positioned relative to the inner wall 83 and outer wall 88 of the turbine assembly 80. The turbine-rotor can include one or more stages depending on the fluid and its application. The amount of energy recovered by a potential fourth-stage is marginal (8.5%) and has thus not been illustrated. The re-acceleration of the exhaust stage after the third stage becomes more difficult to accomplish and much of the energy not extracted is recovered in the diffuser section by the transfer of the energy of momentum. The rotor blades are attached directly to the rotating inner-wall of the turbine assembly 80. The outer edge of the blades can be attached to a rim that fits within a circular groove cut in the stationary outer-wall of the ducted-channel. This eliminates blade-tip losses at both ends of the blades. The first-stage extracts the most energy (50%) followed by the second-stage (25%) and third-stage (12%). A turbine assembly 80 can most easily be operated as a one-stage turbine, but the additional energy extracted by three stages easily justifies their inclusion into the design.

Figure 14A:
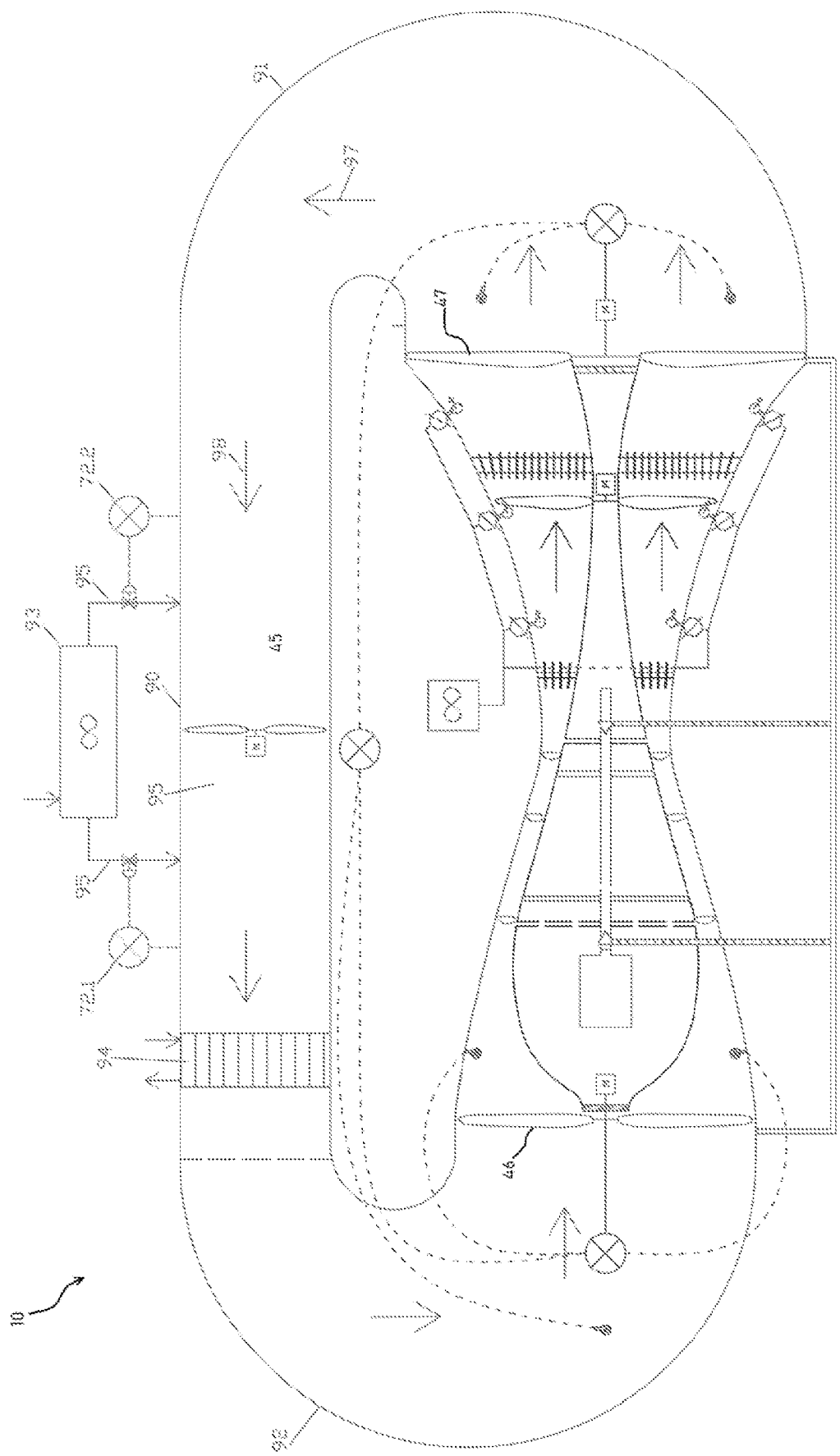
FIG. 14A is a schematic drawing showing a longitudinal cross-sectional view of a powered augmented fluid turbine operating in a recycle mode for a low-density fluid, in accordance with an illustrative embodiment of the present invention.

Referring now to FIG. 14A, in an alternate embodiment, PAFT 10 may operate in a closed loop recycle mode for a low-density, compressible fluid such as air, wherein the infeed flow to the convergent inlet and discharge flow from the diffuser exhaust have been modified and the PAFT is sealed and pressurised. Essentially, a free-flow PAFT as in FIGS. 3 to 11 with two propulsor units has been converted to also recycle its flow-streams in a closed, pressurized system. As the fluid exits the PAFT 10, it passes through an outlet distribution header 91 through a recycle line 90 towards an inlet distribution header 92 where it re-enters the PAFT 10.

Still referring to FIG. 14A, a recycle-propulsor unit 45 is used to inject additional external energy into the flow-stream 98 inside the recycle line 90. Additional control loops are used to manage the amount of energy injected. In low-density recycle mode applications, the three propulsors (inlet propulsor 46, outlet propulsor 47 and recycle propulsor 45) are typically in the form of an inline axial fan and the three units operate together with their process controllers balancing the energies injected by each unit. The outlet distribution header 91 is circular and seals the surface area of the discharge of the diffuser section 40. Similarly, the inlet distribution header 92 is circular and seals the surface area of the inlet of the convergent section 20. Both distribution headers 91, 92 may include turning vanes to create smooth, even flows out of the diffuser section 40 and into the convergent section 20, which is important to maintain operational efficiency.

Still referring to FIG. 14A, the recycle propulsor 45 injects at least sufficient external energy to transfer the flow-stream from the diffuser discharge 40 to the convergent inlet 20. The inlet of the diffuser distribution header 91 has a greater surface area than that of the exhaust of the diffuser section 40 to allow for the creation of an air curtain (not shown) at the exhaust of the diffuser section 40.

Still referring to FIG. 14A, the goal of operating the PAFT 10 in recycle mode is to recover the kinetic energy from the diffuser discharge flow-stream and to pressurise all the turbine flow-streams by introducing a compressed fluid such as compressed air from a compressed fluid source 93 via a distribution line 95 discharging into the sealed system at the diffuser exhaust 40 and at the convergent inlet 20. Pressurization of the system reduces and buffers the level of turbulence within the PAFT flow-streams and makes it possible to add greater quantities of injected external energy to reduce the process limitations related to early-BLS. Low-density pressure control loops operate above atmospheric pressure and maintain stable pressures at the convergent inlet 20 and the diffuser discharge 40. Some of the energy injected by the propulsor units 45, 46, 47 will be converted to heat. Over time the build up of heat will lead to a high temperature of the flow-streams. An in-line heat exchanger 94 is thus provided in the recycle-line 90 to remove excess heat from the flow-stream and thus control the fluid temperature. The medium for cooling the fluid may be, for example, air, water or an appropriate refrigerant.

Figure 14B:
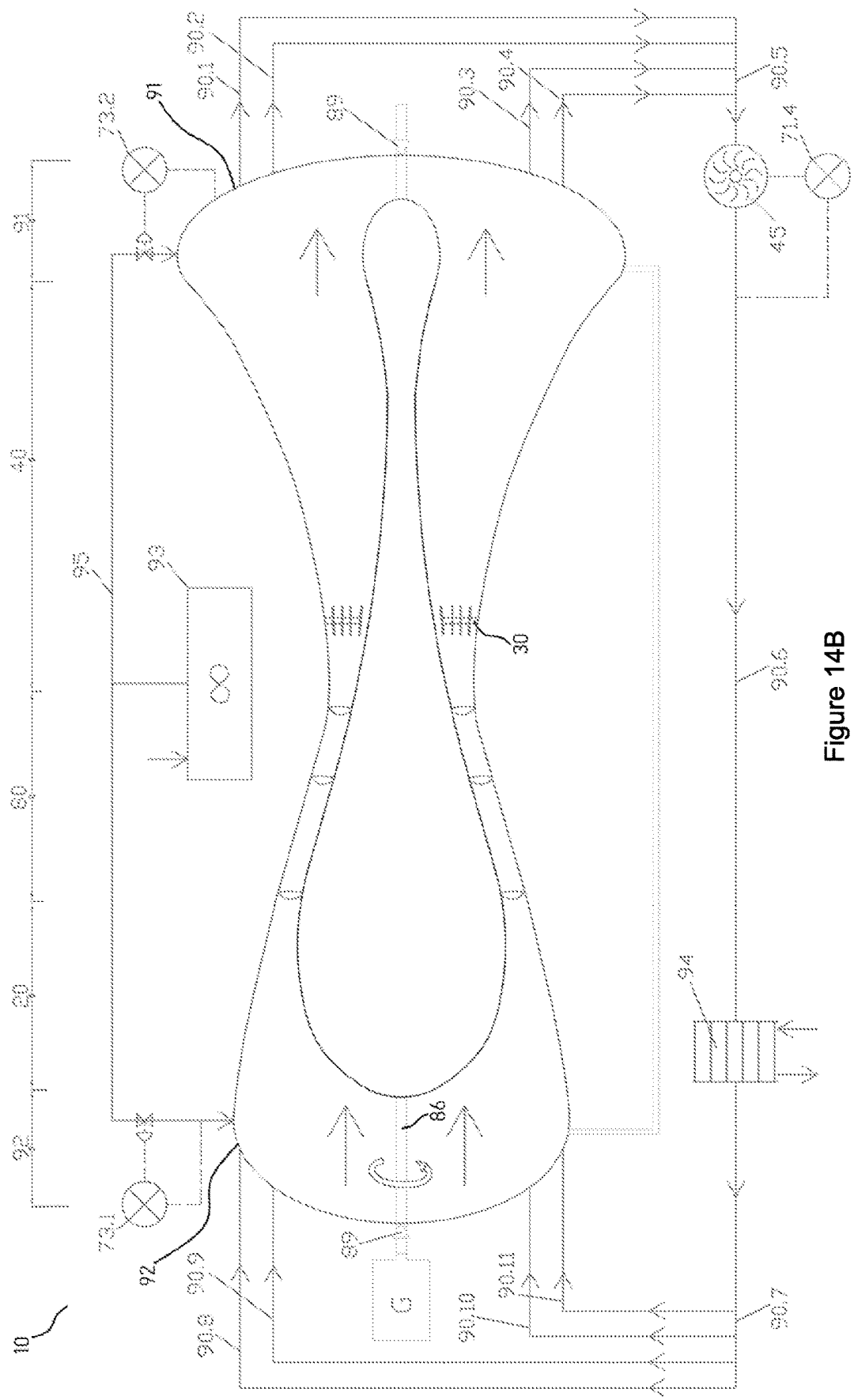
FIG. 14B is a schematic drawing showing a longitudinal cross-sectional view of a powered augmented fluid turbine operating in a recycle mode for a high-density fluid, in accordance with an illustrative embodiment of the present invention.

Referring now to FIG. 14B, in an alternate embodiment, PAFT 10 may operate in a closed loop recycle mode for a high-density, incompressible liquid such as water, water mixtures, alcohols, and thermal fluids, as well as others. Essentially, the design of a free-flow PAFT as in FIGS. 3 to 11 has been converted to also recycle its flow-streams in a closed, pressurized system. In this embodiment, the infeed to the convergent section 20 is now fed by an inlet distribution header 92 and the exhaust from the diffuser section 40 is drawn away by an outlet distribution header 91. Additional energy is injected to the recycle line 90 by a recycle-propulsor 45 that may be, for example, in the form of a pump frame and motorised rotating pump impeller. Depending on the liquid application and its flow rate, the recycle propulsor 45 may be employed with or without the use of an inlet propulsor 46 and outlet propulsor 47. With high-density liquids such as water, normally only a single recycle propulsor 45 will be needed, as illustrated in FIG. 14B. In such an embodiment, the recycle propulsor 45 may comprise energy-injecting pumps (not shown) arranged in series. In an additional embodiment, for high-density fluids such as water, the turbine assembly 80 may be water-tight, thus increasing the buoyancy of the rotating assembly which is floating in the fluid flow stream. This reduces stress and loads on the end bearings 89 and on the rotating shaft 86.

Still referring to FIG. 14B, the headers 91, 92 provide uniform flow distributions to the convergent section 20 and from the diffuser section 40. Uneven or unstable flow distribution would cause instability in the flow-streams throughout the turbine assembly 80 which would decrease the efficiency of the energy extraction and may cause vibrations. To create the headers 91, 92, the surface area of the exhaust of the diffuser section 40 is sealed by an end plate with one or multiple orifices (not shown) connected to pipes (90.1-90.5) forming the recycle line 90 that feed into a single large diameter pipe 90.6 that feeds the suction of the recycle propulsor 45. Similarly, the surface area of the inlet of the convergent section 20 is sealed by an end plate equipped with one or multiple orifices (not shown) and connecting pipes (90.7-90.11) that are fed by the discharge of the recycle propulsor 45. The end plates have a circular area with a flat face, but as a person skilled in the art would understand, the faces of the distribution headers 91, 92 may also be flat with curved edges or in the shape of a half-moon. The assembly consisting of the end plates, orifices and associated piping up to the recycle propulsor 95 constitute the inlet distribution header 92 and the assembly of the end plates and orifices and associated piping up to the recycle propulsor 45 constitute the outlet distribution header 91. The recycle line assembly 90 consists of all the components added to connect the diffuser section 40 to the convergent section 20.

Still referring to FIG. 14B, the intent of this embodiment is to recover the remaining kinetic energy from the discharging flow-stream from the diffuser section 40 and to pressurise the entire system to reduce the possibility of flow disturbances in the PAFT flow-streams and again, particularly in the diffuser section 40. To maintain a constant pressure above atmospheric pressure, a compressed fluid such as compressed air is stored in a compressed fluid source 93 and injected above the level of the liquid in the PAFT 10, illustratively water, at the feed to the convergent section 20 and the exhaust from the diffuser section 40. Pressure controllers 73.1, 73.2 maintain the required static pressure at each point of compressed fluid injection into the flow-streams. As a person of skill in the art would understand, the desired increase in the working pressure of the liquid flow streams can also be achieved by applying pressure through a mechanised ram-type cylinder in contact with the flow streams.

Still referring to FIG. 14B, the recycle-propulsor 45 for injecting external energy into the flow-stream of the recycle line 90 is shown along with the addition of a recycle line controller 71.4 for managing the amount of external energy injected. The recycle propulsor 45 is acting as a pump with a rotating impeller and the volumetric flow recycled is adjusted by varying the speed of rotation of the pump's impeller. The external energy injected by the pump is at least sufficient to recycle the flow-stream through the turbine assembly 80 and to compensate for frictional energy losses and for any energy extraction at the turbine assembly 80. Some of the energy injected by the recycle propulsor 45 will be converted to heat, and as such a heat exchanger 94 will remove excess heat from the flow-stream and control the temperature of the liquid. The heating/cooling medium of the heat exchanger 94 may, for example, be air, water, refrigerant or electric coils depending upon the situation and climate. Additionally, the exterior face of the outer-wall of the ducted channel 11 and the components of the recycle line 90 may be insulated to minimise thermal expansion/contraction of the components.

The functionality of the components of a PAFT 10 that impact the key processes of compression, decompression, pressurization and energy extraction are the same for a PAFT 10 operating in free-flow mode (as in FIGS. 3-11) as for a PAFT 10 operating in recycle mode with either low-density fluids (as in FIG. 14A) and high-density fluids (as in FIG. 14B). For low-density fluids (FIG. 14A), a rotating profiled blade in the form of a fan injects energy into the PAFT flow-streams, whereas for a high-density fluid (FIG. 14B), a rotating profiled blade normally in the form of a pump injects external energy into the flow-steams. The various embodiments of a PAFT 10 as described herein comprise a universal design that requires only small modifications to the rotor blades and the propulsor unit blades to compensate for various fluid properties such as the density and viscosity. The various processes are however almost identical and are all governed by the laws of fluid-dynamics.

As a person skilled in the art will understand, the injection of external energy into a fluid-stream may be accomplished by using many different devices other than the stated pumps and fans. Similarly, for the process of energy extraction at the rotor, the low-density fluids may employ an air-profiled blade whereas high-density fluids may employ a hydro-profiled blade.

One area where the physical disposition of the components within the turbine will differ based on the density of the fluids is in the components that transmit the torque produced by the blades to the electrical generator. For example, for a fluid application such as air in recycle mode, the electrical generator can be situated within the enclosure created by the inner-wall of the turbine assembly. Additionally, for a fluid application such as water, the electrical generator and the bearings supporting the shaft driving it need to be located outside of the enclosure.

For high-density fluids, the turbine assembly 80 is water tight and the rotating assembly is floating in the fluid flow-stream. This reduces stress and loads on the end bearings and rotating shaft. For low-density fluids, the effect of buoyancy is greatly decreased, and the enclosure may or may not be water-tight.

As a person skilled in the art would understand, as the fluids pass through the stages of the blades, part of the axial velocity of the flow-stream is converted into radial or rotational velocity. Particularly with high-density fluids, this normal flow distortion can cause problems for succeeding stages of blades and as a result some stationary vanes may be inserted between the rotating stages as required. Stages of stationary blades will be fixed to the outer-wall of the ducted-channel between the rotor-stages and would appear as rows of vanes, normally with fluid-foil profiles to reduce drag created over their surfaces.

Although FIG. 14B illustrates a turbine rotor blade assembly with conically-shaped inner and outer walls and varying blade lengths, for liquids, cylindrically shaped inner and outer walls employing blades of equal length are a preferred embodiment.

The scope of the claims should not be limited by the preferred embodiments set forth in the examples but should be given the broadest interpretation consistent with the description as a whole.

The invention claimed is:

1. A powered augmented fluid turbine (10) for generating electricity from a fluid in motion, the powered augmented fluid turbine (10) comprising:
   a central annular ducted channel (11) extending between an inlet distribution header (92) for receiving the fluid and an outlet distribution header (91) for expelling the fluid, said central annular ducted channel (11) comprising a converging section (20) configured to accelerate the fluid received at said inlet distribution header (92), a turbine assembly (80) for generating electricity, and a diffuser section (40) configured to decelerate the fluid before the fluid exits at said outlet distribution header (91);
   a recycle line (90) for transporting the fluid exiting from said outlet distribution header (91) to said inlet distribution header (92) in a closed-loop configuration, said recycle line (90) comprising a recycle line propulsor (45) controllable by a recycle line controller (71.4) and a recycle line heat exchanger (94); and
   a compressed fluid distribution line (95) configured to pressurize the fluid in motion by transporting a compressed fluid from a compressed fluid source (93) to said inlet distribution header (92) and to said outlet distribution header (91), said compressed fluid distribution line (95) controllable by at least one pressure controller (73).

2. The powered augmented fluid turbine (10) of claim 1, wherein said turbine assembly (80) comprises a plurality of annular rotors (82) with a plurality of rotor blades (82.1, 82.2, 82.3) for generating torque from the fluid in motion, a rotating central shaft (86) and a generator (99) driven by said rotating central shaft (86).

3. The powered augmented fluid turbine (10) of claim 1, wherein the fluid in motion comprises a liquid or water.

4. The powered augmented fluid turbine (10) of claim 1, wherein said outlet distribution header (91) and said inlet distribution header (92) each comprise at least one orifice, each said orifice transporting the fluid either from said outlet distribution header (91) to said recycle line (90) or from said recycle line (90) to said inlet distribution header (92).

5. The powered augmented fluid turbine (10) of claim 1, wherein said compressed fluid comprises compressed air.

6. The powered augmented fluid turbine (10) of claim 1 further comprising at least one flow stream distributor (30) positioned at the beginning of said diffuser section (40), said at least one flow stream distributor (30) comprising a plurality of foils (31) for separating the fluid in motion into a plurality of distinct flow channels (18) such that each said flow channel is at a predetermined flow angle (52) relative to an inner sidewall surface of said diffuser section (40).

7. The powered augmented fluid turbine (10) of claim 1, wherein said turbine assembly (80) is water-tight.

8. The powered augmented fluid turbine (10) of claim 1, wherein the ratio of the surface area of the inlet of the convergent section (20) to the surface area of the outlet of the convergent section (20) is at least 3.5 to 1.

9. A powered augmented fluid turbine (10) for generating electricity from a fluid in motion, the powered augmented fluid turbine (10) comprising:
   a central annular ducted channel (11) extending between an inlet distribution header (92) for receiving the fluid and an outlet distribution header (91) for expelling the fluid, said central annular ducted channel (11) comprising a converging section (20) configured to accelerate the fluid received at said inlet distribution header (92), a turbine assembly (80) for generating electricity, and a diffuser section (40) configured to decelerate the fluid before the fluid exits at said outlet distribution header (91);
   an inlet propulsor (46) for propelling the fluid from said inlet into said converging section (20), said inlet propulsor (46) controllable by at least one control unit (71) and drivable by a first variable speed motor (M);
   an outlet propulsor (47) for propelling the fluid out of said diffuser section (40), said outlet propulsor (47) controllable by said at least one control unit (71) and drivable by a second variable speed motor (M);
   a plurality of velocity sensors (70), each said velocity sensor (70) for recording a velocity recording of the fluid in motion at a given point in the powered augmented fluid turbine (10) and sending said velocity recording to said control unit (71);
   a recycle line (90) for transporting the fluid exiting from said outlet distribution header (91) to said inlet distribution header (92) in a closed-loop configuration, said recycle line (90) comprising a recycle line propulsor (45) and a recycle line heat exchanger (94); and
   a compressed fluid distribution line (95) configured to pressurize the fluid in motion by transporting a compressed fluid from a compressed fluid source (93) to said inlet distribution header (92) and said outlet distribution header (91), said compressed fluid distribution line (95) controllable by at least one pressure controller (73).

10. The powered augmented fluid turbine (10) of claim 9, further comprising at least one velocity rectifier (41) positioned in said diffuser section (40), said at least one velocity rectifier (41) injecting energy into the fluid in motion.

11. The powered augmented fluid turbine (10) of claim 9, wherein the fluid in motion comprises air and/or said compressed fluid comprises compressed air.

12. The powered augmented fluid turbine (10) of claim 9, wherein said turbine assembly (80) comprises a plurality of annular rotors (82), a rotating central shaft (86) and a generator (99) driven by said rotating central shaft (86).

13. The powered augmented fluid turbine (10) of claim 12, wherein said generator (99) comprises a constant speed generator.

14. The powered augmented fluid turbine (10) of claim 9, wherein one of said plurality of velocity sensors (70.1) is positioned upstream of said inlet propulsor (46) and sends said velocity recordings to a first said at least one control unit (71.1), at least one of said plurality of velocity sensors (70.2) is positioned downstream of said inlet propulsor (46) and sends said velocity recordings to a second said at least one control unit (71.2), and at least one of said plurality of velocity sensors (70.3) is downstream of said outlet propulsor (47) and sends said velocity recordings to a third said at least one control unit (71.3).

15. The powered augmented fluid turbine (10) of claim 9 further comprising at least one flow stream distributor (30) positioned at the beginning of said diffuser section (40), said at least one flow stream distributor (30) comprising a plurality of foils (31) for separating the fluid in motion into a plurality of distinct flow channels (18) such that each said flow channel is at a predetermined flow angle (52) relative to an inner sidewall surface of said diffuser section (40).

16. The powered augmented fluid turbine (10) of claim 10, comprising a plurality of outlet guide vanes (44) downstream of said at least one velocity rectifier (41), said plurality of outlet guide vanes (44) preventing a rotating flow-stream in the fluid in motion.

17. The powered augmented fluid turbine (10) of claim 9, further comprising a fan (55) supplying pressurized air to said diffuser section (40) via a pressurized manifold (56) and at least one nozzle (58), the flow of said pressurized air controllable by a volume control (57), said pressurized air energizing said fluid in motion in said diffuser section (40).

18. The powered augmented fluid turbine (10) of claim 9, wherein an inner-wall (83) of said turbine assembly (80) rotates as part of said turbine assembly (80).

19. The powered augmented fluid turbine (10) of claim 9, wherein said turbine assembly (80) is water-tight.

20. The powered augmented fluid turbine (10) of claim 9, wherein the ratio of the surface area of the inlet of the convergent section (20) to the surface area of the outlet of the convergent section (20) is at least 3.5 to 1.

* * * * *